United States Patent
Yang et al.

(10) Patent No.: US 11,979,886 B2
(45) Date of Patent: May 7, 2024

(54) REDUNDANCY VERSION CONFIGURATION FOR URLLC DCI FORMAT

(71) Applicant: QUALCOMM Incorporated, San Diego, CA (US)

(72) Inventors: Wei Yang, San Diego, CA (US); Gabi Sarkis, San Diego, CA (US); Seyedkianoush Hosseini, San Diego, CA (US); Seyed Ali Akbar Fakoorian, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 149 days.

(21) Appl. No.: 17/331,214

(22) Filed: May 26, 2021

(65) Prior Publication Data

US 2021/0377999 A1     Dec. 2, 2021

Related U.S. Application Data

(60) Provisional application No. 63/030,834, filed on May 27, 2020.

(51) Int. Cl.
*H04W 72/23* (2023.01)

(52) U.S. Cl.
CPC .................. *H04W 72/23* (2023.01)

(58) Field of Classification Search
None
See application file for complete search history.

(56) References Cited

U.S. PATENT DOCUMENTS

| | | | |
|---|---|---|---|
| 2005/0076283 A1* | 4/2005 | Malkamaki | H04L 1/1819 714/748 |
| 2006/0069976 A1* | 3/2006 | Ishizaki | H04L 1/1854 714/748 |
| 2009/0028129 A1* | 1/2009 | Pi | H04L 1/1819 370/351 |
| 2016/0135143 A1* | 5/2016 | Won | H04W 52/367 370/312 |
| 2019/0181976 A1* | 6/2019 | Golitschek Edler von Elbwart | H04L 1/0004 |

(Continued)

FOREIGN PATENT DOCUMENTS

KR     20200086535 A  *  7/2020  ........... H04L 1/0009

*Primary Examiner* — Ajit Patel
*Assistant Examiner* — Liem H. Nguyen
(74) *Attorney, Agent, or Firm* — Arent Fox LLP/Qualcomm Incorporated

(57) ABSTRACT

Example implementations include a method, apparatus and computer-readable medium of wireless communication, including receiving a configuration of one or more downlink control information (DCI) formats to include a single bit for a redundancy version field. The implementations further include receiving a radio resource control (RRC) message indicating selectable redundancy versions. Additionally, the implementations further include detecting a DCI based on the one or more DCI formats including the single bit for the redundancy version field, the DCI scheduling a transmission. Additionally, the implementations further include selecting a redundancy version from the selectable redundancy versions based on the single bit. Additionally, the implementations further include encoding or decoding the transmission based on the redundancy version.

12 Claims, 11 Drawing Sheets

(56) References Cited

U.S. PATENT DOCUMENTS

| | | | | |
|---|---|---|---|---|
| 2019/0182807 | A1* | 6/2019 | Panteleev | H04L 5/0048 |
| 2019/0253986 | A1* | 8/2019 | Jeon | H04B 7/0626 |
| 2020/0137627 | A1* | 4/2020 | Nammi | H04L 1/1896 |
| 2020/0204312 | A1* | 6/2020 | Xu | H04L 5/001 |
| 2021/0143932 | A1* | 5/2021 | Xu | H04L 1/1819 |
| 2021/0315002 | A1* | 10/2021 | Nakamura | H04W 28/04 |
| 2022/0052820 | A1* | 2/2022 | Ling | H04L 1/18 |
| 2022/0191899 | A1* | 6/2022 | Hwang | H04L 1/1822 |
| 2022/0216944 | A1* | 7/2022 | Muruganathan | H04W 72/0446 |
| 2022/0231789 | A1* | 7/2022 | Ying | H04L 5/0053 |
| 2022/0361191 | A1* | 11/2022 | Awad | H04W 72/14 |
| 2023/0069881 | A1* | 3/2023 | Rastegardoost | H04L 5/0051 |

* cited by examiner

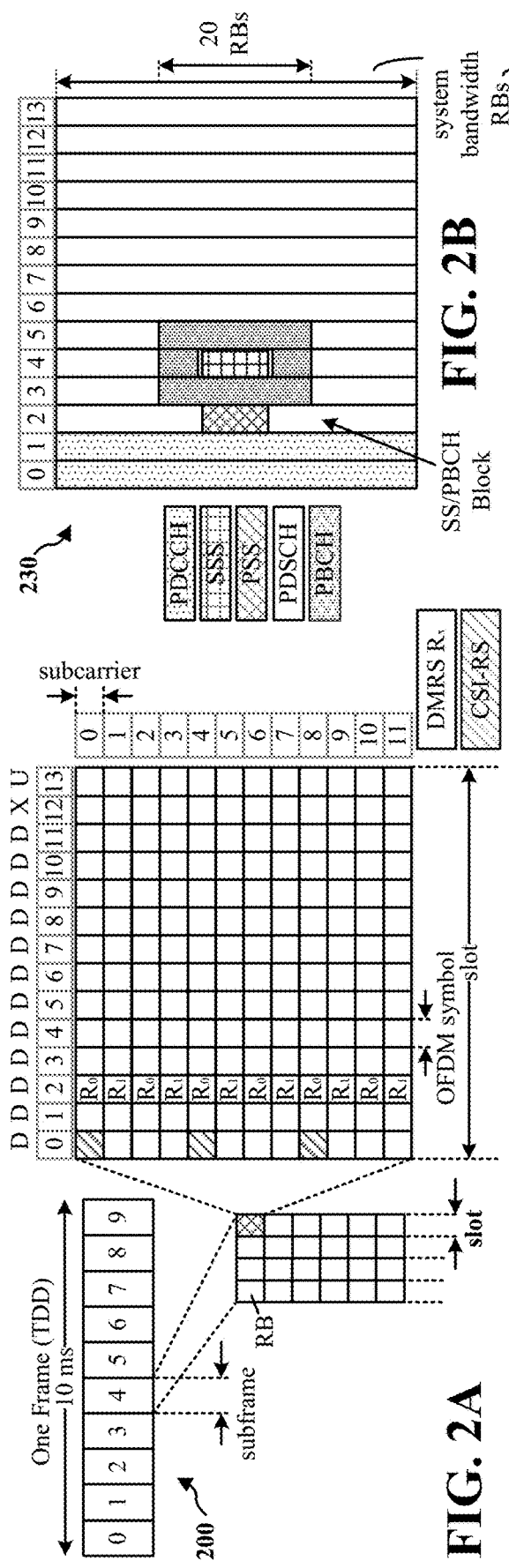
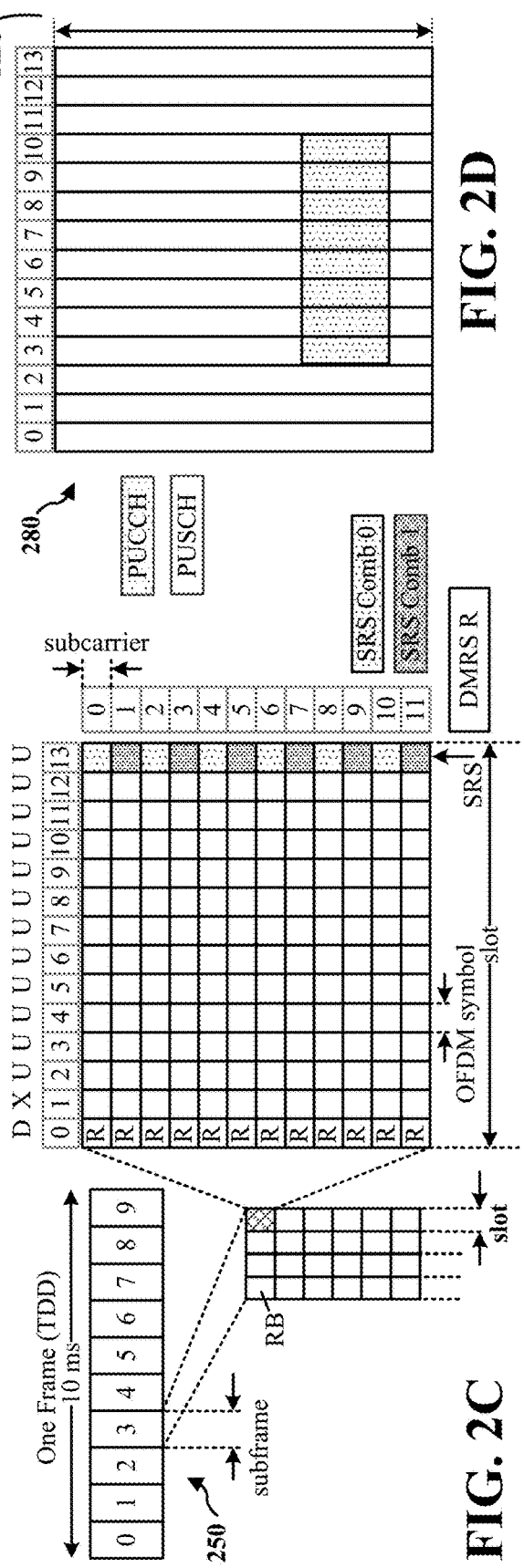

1100

1110

Transmit a configuration of one or DCI formats to include a single bit for a redundancy version field

1120

Determine a single bit that indicates a set of selectable redundancy versions for a transmission based on whether the transmission is to be transmitted with repetitions

1130

Transmit a DCI based on the one or more DCI formats including the single bit for the redundancy version field, the DCI scheduling a transmission with a redundancy version for each repetition selected according to a redundancy version sequence

1140

Indicate whether the transmission scheduled by the DCI is to be transmitted with repetitions

1150

Transmit or receive the transmission based on the set of selectable redundancy versions

FIG. 11

REDUNDANCY VERSION CONFIGURATION FOR URLLC DCI FORMAT

CROSS REFERENCE TO RELATED APPLICATIONS

This application claims priority to U.S. Provisional Application No. 63/030,834 titled "REDUNDANCY VERSION CONFIGURATION FOR URLLC DCI FORMAT," filed May 27, 2020, which is assigned to the assignee hereof, and incorporated herein by reference in its entirety.

BACKGROUND

Technical Field

The present disclosure relates generally to communication systems, and more particularly, to apparatus and methods of redundancy version configuration for ultra-reliable low latency communication (URLLC) downlink control information (DCI) format.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, the present disclosure provides a method, apparatus (e.g., a user equipment (UE)), and non-transitory computer readable medium for determining a redundancy version for a transmission. The method may include receiving a configuration of one or more downlink control information (DCI) formats to include a single bit for a redundancy version field. The method further includes receiving a radio resource control (RRC) message indicating selectable redundancy versions. Additionally, the method further includes detecting a DCI based on the one or more DCI formats including the single bit for the redundancy version field, the DCI scheduling a transmission. Additionally, the method further includes selecting a redundancy version from the selectable redundancy versions based on the single bit. Additionally, the method further includes encoding or decoding the transmission based on the redundancy version.

The disclosure also provides an apparatus (e.g., a UE) including a memory storing computer-executable instructions, a transceiver, and at least one processor configured to execute the computer-executable instructions to perform the above method, an apparatus including means for performing the above method, and a computer-readable medium storing computer-executable instructions for performing the above method.

In an aspect, the present disclosure provides a method, apparatus (e.g., a UE), and non-transitory computer readable medium for determining a redundancy version for a transmission. The method may include receiving a configuration of one or more DCI formats to include a single bit for a redundancy version field. The method further includes detecting a DCI based on the one or more DCI formats including the single bit for the redundancy version field, the DCI scheduling a transmission. Additionally, the method further includes determining whether the transmission scheduled by the DCI is to be transmitted with repetitions. Additionally, the method further includes determining a set of selectable redundancy versions for the transmission based on the single bit and whether the transmission is to be transmitted with repetitions. Additionally, the method further includes encoding or decoding the transmission based on the set of selectable redundancy versions.

The disclosure also provides an apparatus (e.g., a UE) including a memory storing computer-executable instructions, a transceiver, and at least one processor configured to execute the computer-executable instructions to perform the above method, an apparatus including means for performing the above method, and a computer-readable medium storing computer-executable instructions for performing the above method.

In another aspect, the present disclosure provides a method, apparatus (e.g., a base station), and non-transitory computer readable medium for determining a redundancy version for a transmission. The method may include comprising transmitting a configuration of one or more DCI formats to include a single bit for a redundancy version field. The method further includes transmitting a RRC message indicating selectable redundancy versions. Additionally, the method further includes transmitting a DCI based on the one or more DCI formats including the single bit for the redundancy version field, the DCI scheduling a transmission with a redundancy version selected from the selectable redundancy versions. Additionally, the method further includes encoding or decoding the transmission based on the redundancy version.

The disclosure also provides an apparatus (e.g., a base station) including a memory storing computer-executable instructions, a transceiver, and at least one processor configured to execute the computer-executable instructions to perform the above method, an apparatus including means for performing the above method, and a computer-readable medium storing computer-executable instructions for performing the above method.

In another aspect, the present disclosure provides a method, apparatus (e.g., a base station), and non-transitory computer readable medium for determining a redundancy version for a transmission. The method may include transmitting a configuration of one or more DCI formats to include a single bit for a redundancy version field. The method further includes determining a single bit that indicates a set of selectable redundancy versions for a transmission based on whether the transmission is to be transmitted with repetitions. Additionally, the method further includes transmitting a DCI based on the one or more DCI formats including the single bit for the redundancy version field, the DCI scheduling a transmission with a redundancy version for each repetition selected according to the set of selectable redundancy versions. Additionally, the method further includes indicating whether the transmission scheduled by the DCI is to be transmitted with repetitions. Additionally, the method further includes encoding or decoding the transmission based on the set of selectable redundancy versions.

The disclosure also provides an apparatus (e.g., a base station) including a memory storing computer-executable instructions, a transceiver, and at least one processor configured to execute the computer-executable instructions to perform the above method, an apparatus including means for performing the above method, and a computer-readable medium storing computer-executable instructions for performing the above method.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first 5G NR frame.

FIG. 2B is a diagram illustrating an example of DL channels within a 5G NR subframe.

FIG. 2C is a diagram illustrating an example of a second 5G NR frame.

FIG. 2D is a diagram illustrating an example of UL channels within a 5G NR subframe.

FIG. 11 is a flowchart of an example method for a base station to schedule a transmission with a redundancy version based on a sequence of redundancy versions.

DETAILED DESCRIPTION

Figure 1:
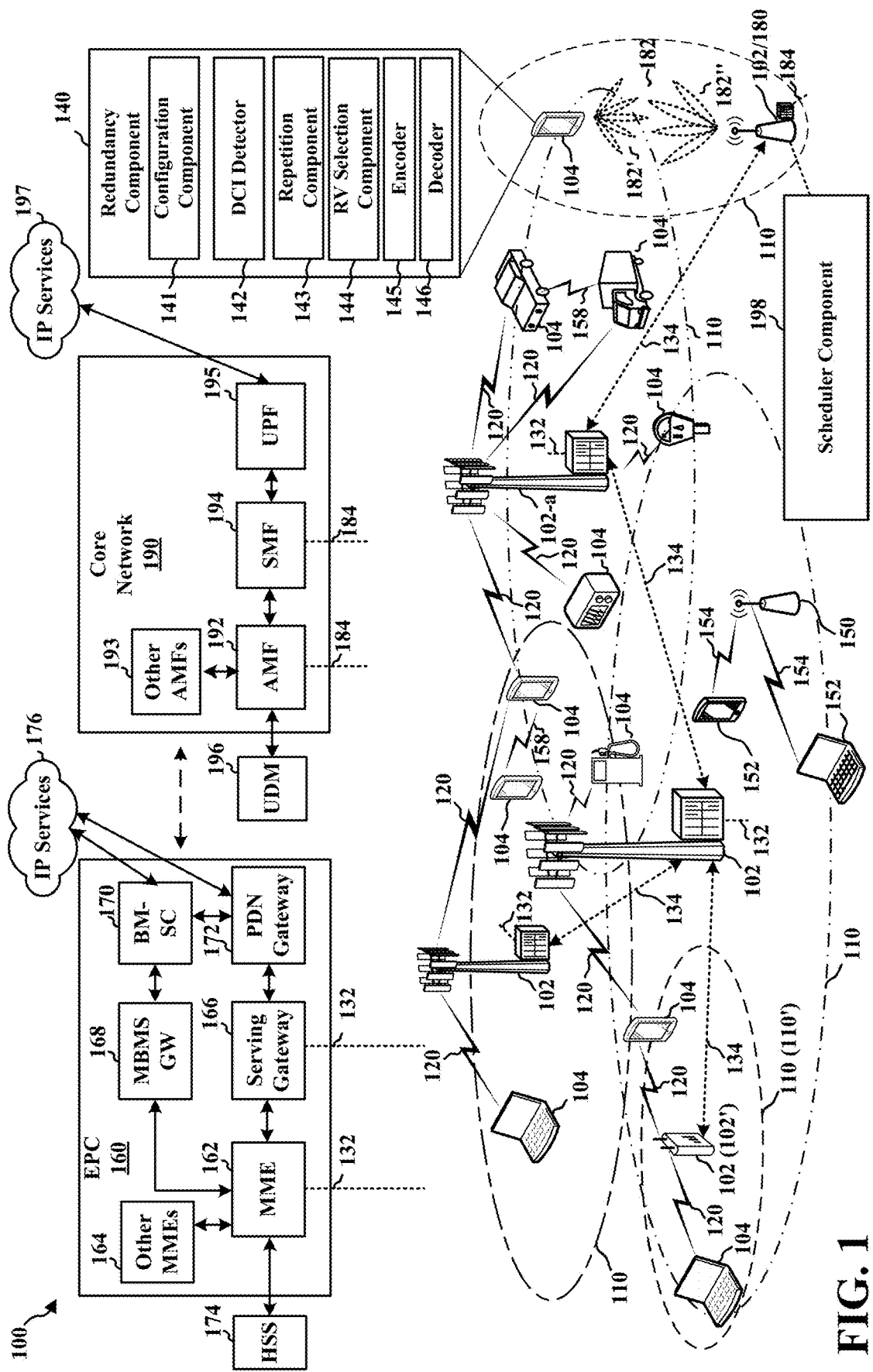
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Wireless communications may utilize retransmissions with incremental redundancy to improve decoding at a receiver. Encoded bits including systematic bits and parity bits may be transmitted in different groups referred to as redundancy versions. For example, four redundancy versions may be defined by starting positions for bit selection. Depending on rate matching, the bits included in each redundancy version may overlap. In an example use case, a first received transmission received at a receiver may not be decodable. The transmitter may transmit a second transmission having a different redundancy version. The receiver may combine the information from the first transmission and the second transmission to increase chances of successfully decoding the transmissions. In some cases, a first transmission may not be received (for example, because a scheduling downlink control information (DCI) was not received correctly). Depending on the redundancy version of the second transmission, the receiver may decode the second transmission alone. Otherwise, another transmission having a different redundancy version may be transmitted.

For 5G new radio (5G NR) ultra-reliable low latency communications (URLLC) a new DCI format has been proposed with a relatively smaller payload size than used for enhanced mobile broadband (eMBB) communications. The DCI format may be referred to as DCI format 0_1 for uplink scheduling and DCI format 1_2 for downlink scheduling. Various fields of the new DCI format may be configurable. In particular, the number of bits for a redundancy version (RV) field of the new DCI format may be configurable between 0 bits and 2 bits. For 0 bits, the RV may be fixed. For 2 bits, any of the four RVs may be indicated. For 1 bit, however, only a subset of the RVs may be utilized.

In an aspect, the present disclosure provides for techniques for selection of a redundancy version when a DCI format is configured to include a single bit RV field. In a first aspect, a radio resource control (RRC) configuration message may include one or more parameters that indicate selectable RVs. The parameters for uplink and downlink may be different. In some implementations, the parameters may indicate different selectable redundancy versions for different priorities of uplink transmissions. A base station may transmit a DCI including the single bit RV field. A user equipment (UE) may receive the DCI and determine a RV for a transmission based on the single bit and the selectable RVs. For example, the UE may be RRC configured with the selectable RVs to be RV 0 and RV 2, and the UE may receive a DCI with a value of the RV field equal to '1'. In this case, the UE will determine that the scheduled transmissions will have RV 2 (i.e., the second RV in the set of selectable RVs). Similarly, if UE is RRC configured with the selectable RVs to be RV 0 and RV 3, and the UE receives a DCI with a value of the RV field equal to '1', then the UE will determine that the scheduled transmissions will have RV 3 (i.e., the second RV in the set of selectable RVs).

In a second aspect, a fixed RV sequence may be utilized. Different sets of selectable RVs may be applied depending on whether a transmission is scheduled with repetitions or not. In some implementations, different RV sequences may be utilized for different priorities of uplink transmissions. The base station may transmit the DCI with a single bit RV field indicating a starting RV. The UE may determine the RV sequence for one or more repetitions depending on whether the transmission scheduled by the DCI is to be repeated.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media, which may be referred to as non-transitory computer-readable media. Non-transitory computer-readable media may exclude transitory signals. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

In an aspect, one or more of the UEs 104 may include a redundancy component 140 configured to select a redundancy version for a transmission. The redundancy component 140 may include a configuration component 141 configured to receive a configuration of one or more DCI formats to include a single bit for a redundancy version field. In some implementations, the configuration component 141 is also configured to receive a RRC message indicating selectable redundancy versions. The redundancy component 140 may include a DCI detector 142 configured to detect a DCI based on the one or more DCI formats including the single bit for the redundancy version field. The DCI may schedule a transmission. In some implementations, the redundancy component 140 may optionally include a repetition component 143 configured to determine whether the transmission scheduled by the DCI is to be transmitted with repetitions. The redundancy component 140 may include a RV selection component 144 configured to select a redundancy version. In some implementations, the RV selection component 144 is configured to select a redundancy version from the selectable redundancy versions based on the single bit. In some implementations, the RV selection component 144 is configured to determine a set of selectable redundancy versions for the transmission based on the single bit and whether the transmission is to be transmitted with repetitions. The redundancy component 140 may include an encoder 145 configured to transmit an uplink transmission based on the redundancy version and/or a decoder 146 configured to receive a downlink transmission based on the redundancy version.

Figure 5:
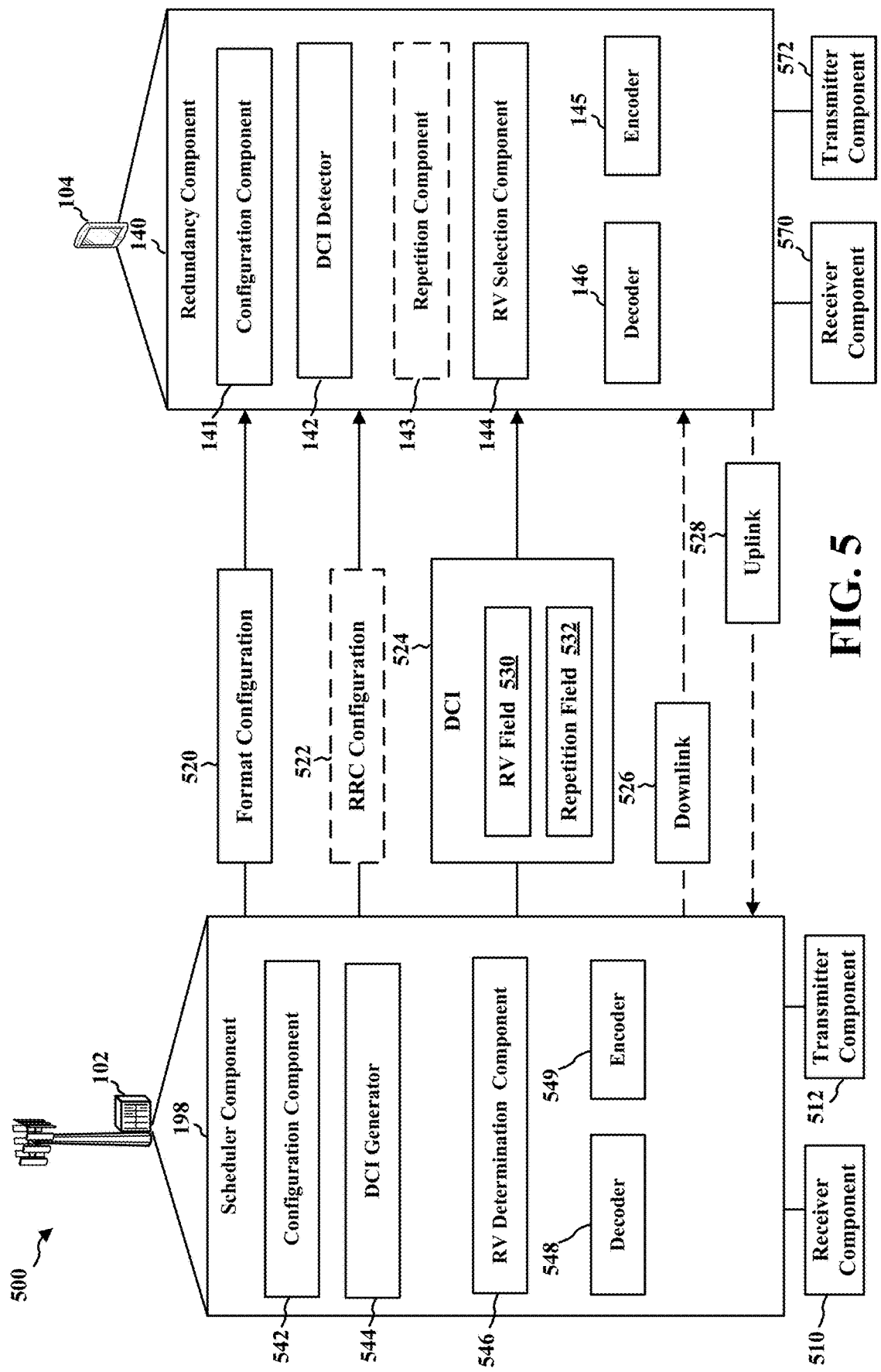
FIG. 5 is a diagram illustrating example communications and components a base station and a UE.

In an aspect, one or more of the base stations 102 may include a scheduler component 198 that determines a redundancy version for a transmission. As illustrated in FIG. 5, the scheduler component 198 may include a configuration component 542 that is configured to transmit a configuration of one or more DCI formats to include a single bit for a redundancy version field. In some implementations, the configuration component 542 is configured to transmit a RRC message indicating selectable redundancy versions. In some implementations utilizing repetitions, a RV for a first transmission may be selected from a set of selectable redundancy versions and a fixed redundancy version sequence may be utilized for subsequent transmissions. The scheduler component 198 may include a DCI generator 544 that is configured to transmit a DCI based on the one or more DCI formats including the single bit for the redundancy version field. In some implementations, the DCI may schedule a transmission with a redundancy version selected from the selectable redundancy versions. In some implementations, the DCI may schedule a transmission with a redundancy version for each repetition selected according to the redundancy version sequence. In some implementations, either the configuration component 542 or the DCI generator 544 may be configured to indicate whether the transmission scheduled by the DCI is to be transmitted with repetitions. The scheduler component 198 may include a RV determination component 546 configured to select a redundancy version. The scheduler component 198 may include an encoder 549 configured to transmit a downlink transmission based on the redundancy version and/or a decoder 548 configured to receive an uplink transmission on the redundancy version.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface), which may be wired or wireless. The base stations 102 configured for 5G NR (collectively referred to as Next Generation RAN (NG-RAN)) may interface with core network 190 through second backhaul links 184, which may be wired or wireless. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a packet-switched (PS) Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe.

Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgment (ACK)/negative ACK (NACK) feedback. The PUSCH carries data, and may additionally be used to carry a buffer status report (BSR), a power headroom report (PHR), and/or UCI.

Figure 3:
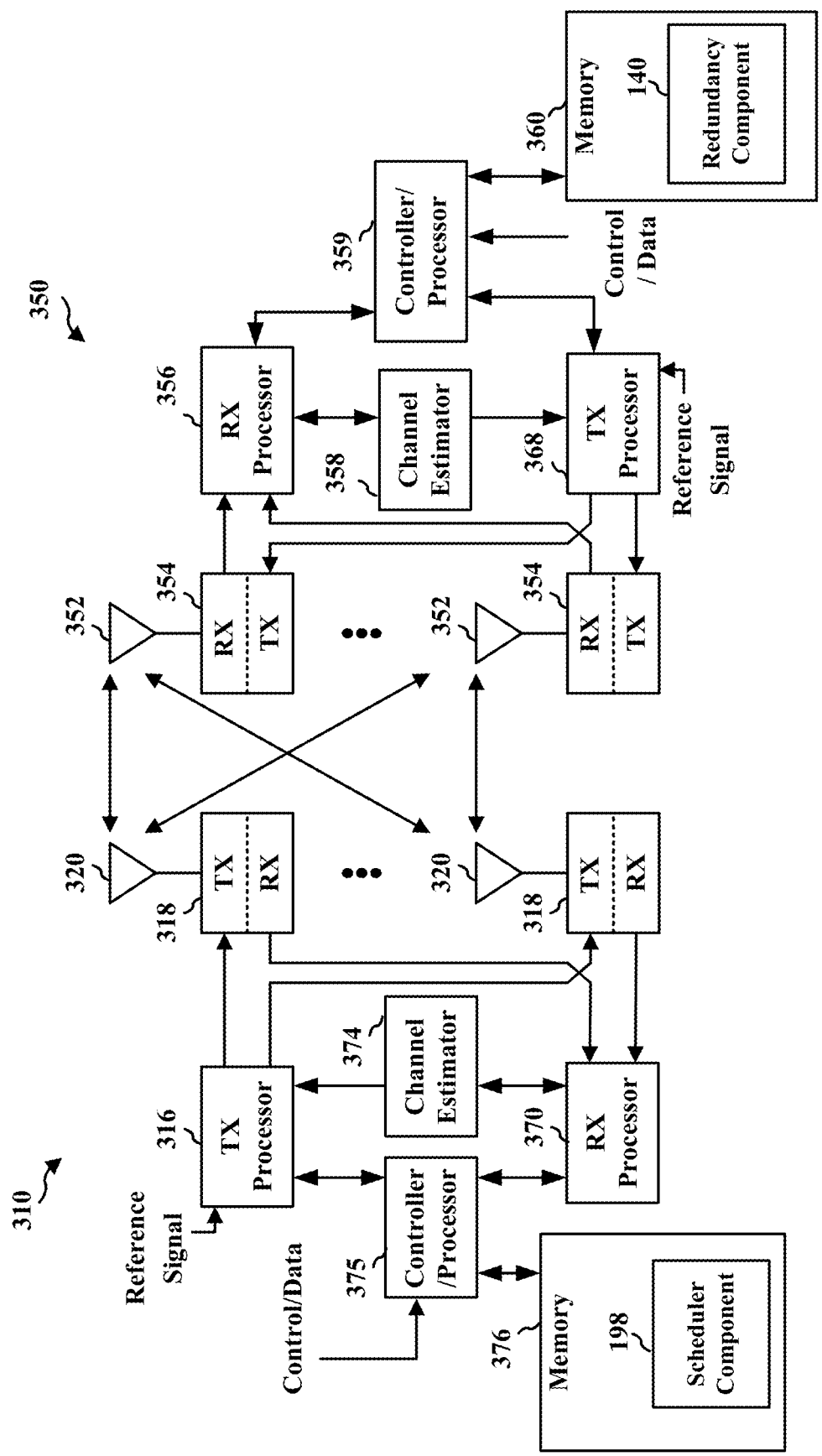
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE

350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the redundancy component 140 of FIG. 1. For example, the memory 360 may include executable instructions defining the redundancy component 140. The TX processor 368, the RX processor 356, and/or the controller/processor 359 may be configured to execute the redundancy component 140.

At least one of the TX processor 316, the RX processor 370, and the controller/processor 375 may be configured to perform aspects in connection with the scheduler component 198 of FIG. 1. For example, the memory 376 may include executable instructions defining the scheduler component 198. The TX processor 316, the RX processor 370, and/or the controller/processor 375 may be configured to execute the scheduler component 198.

Figure 4:
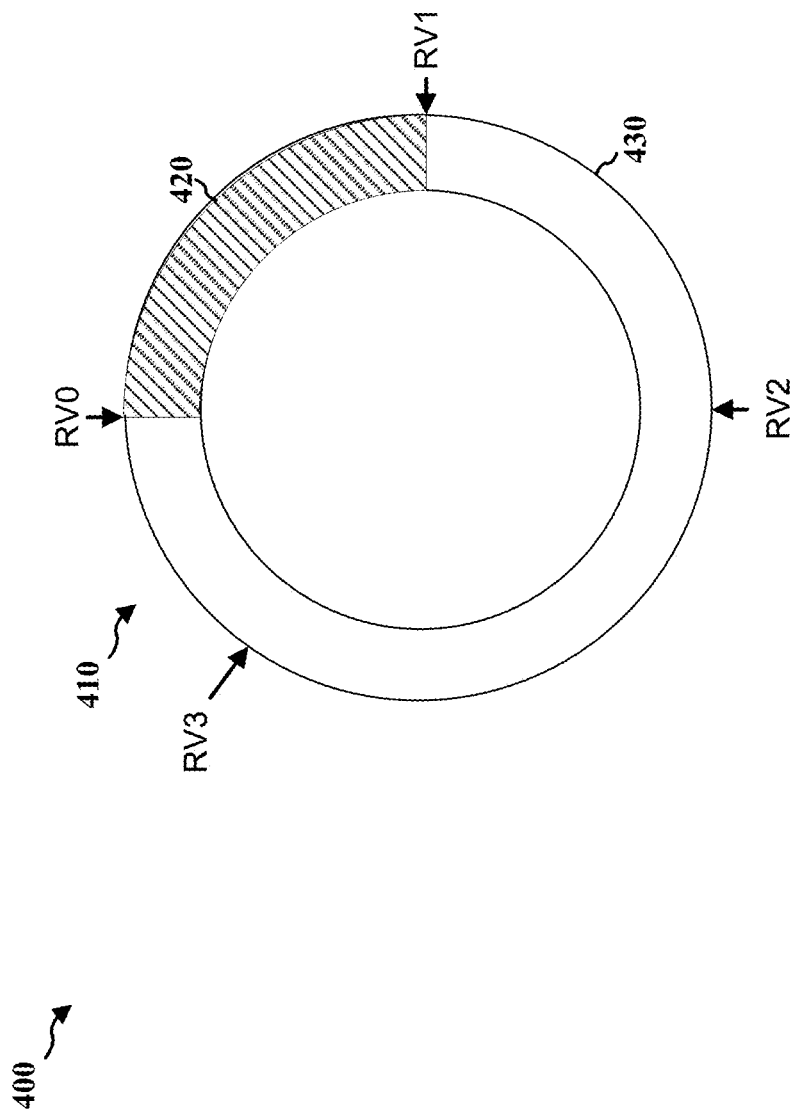
FIG. 4 is a diagram illustrating an example circular buffer for selecting bits based on redundancy versions.

FIG. 4 is a diagram 400 showing an example circular buffer 410 and redundancy versions for transmissions. The circular buffer 410 may be utilized for rate matching for a low density parity check (LDPC) code. The circular buffer may be filled with an ordered sequence of systematic bits and parity bits. For example, an LDPC encoder may output systematic bits 420 followed by parity bits 430. For incremental redundancy (IR) hybrid automatic repeat request (HARQ) (IR-HARQ), each RV, RVi, is assigned a starting bit location Si on the circular buffer 410.

When the available redundancy versions are limited (e.g., due to a 1 bit RV field), there may be a trade-off between self-decodability and performance. RV0 and RV3 are designed such that a transmission based on RV0 or RV3 is self-decodable for all coding rates. RV1 and RV2 are not always self-decodable (especially if the coding rate is high). If a first transmission using RV0 is missed by the receiver, then the receiver may still be able to decode RV3 (using the retransmission only). Hence, using only RVs selected from the set RV [0,3] guarantees self-decodability. For example, if the receiver misses a first transmission (e.g., due to missing DCI), both RV0 and RV3 are decodable by the receiver without combining. In contrast, if IR-HARQ combining is enabled, then the combined RV [0,2] will have a better performance than combined RV [0,1] or [0,3], because with RV [0,2], the encoder may transmit all of the bits of the circular buffer 410 in two transmissions and the decoder may receive all of the different bits in the circular buffer 410 over the two transmissions.

In some implementations, repetition may be applied to a transmission without waiting for HARQ feedback. Such repetition may be referred to as slot aggregation or PUSCH/PDSCH repetition. The number of repetitions may be configured via a RRC message including an information element for a PUSCH aggregation factor or a PDSCH aggregation factor. Alternatively, the number of repetitions may be indicated in a DCI via a number of repetitions parameter for PUSCH. In these cases, the RV field in the DCI will indicate the starting RV of the repetitions. The table below indicates an RV sequence that may be used for repetitions when one of the four RVs is indicated.

TABLE 6.1.2.1-2

Redundancy version for PUSCH transmission

| $rv_{id}$ indicated by the DCI scheduling the PUSCH | $rv_{id}$ to be applied to $n^{th}$ transmission occasion (repetition Type A) or $n^{th}$ actual repetition (repetition Type B) | | | |
|---|---|---|---|---|
| | n mod 4 = 0 | n mod 4 = 1 | n mod 4 = 2 | n mod 4 = 3 |
| 0 | 0 | 2 | 3 | 1 |
| 2 | 2 | 3 | 1 | 0 |
| 3 | 3 | 1 | 0 | 2 |
| 1 | 1 | 0 | 2 | 3 |

For example, when 2 repetitions are included in each grant, RV0 will indicate RVs 0,2 and RV2 will indicate RVs 2,3, and RV3 will indicate RVs 3,1. Therefore, when repetition is configured for PUSCH, using RV [0,3] for the DCI format may have better performance than using RV [0,2] because using RV [0,2] would result in transmission of RV2 for both the initial transmission repetition and a retransmission. In contrast, using RV [0,3], the encoder/decoder may be able to enumerate all four RVs 0,1,2,3 using 2 transmissions, with 2 repetitions in each transmission.

FIG. 5 is a diagram 500 illustrating example communications and components of a base station 102 and a UE 104. The base station 102 includes the scheduler component 198 and the UE 104 includes the redundancy component 140. The scheduler component 198 may be implemented by the memory 376 and the TX processor 316, the RX processor 370, and/or the controller/processor 375 of FIG. 3. For example, the memory 376 may store executable instructions defining the scheduler component 198 and the TX processor 316, the RX processor 370, and/or the controller/processor 375 may execute the instructions. The redundancy component 140 may be implemented by the memory 360 and the TX processor 368, the RX processor 356, and/or the controller/processor 359. For example, the memory 360 may store executable instructions defining the redundancy component 140 and the TX processor 368, the RX processor 356, and/or the controller/processor 359 may execute the instructions.

The base station 102 may include a receiver component 510, which may include, for example, a radio frequency (RF) receiver for receiving the signals described herein. The base station 102 may include a transmitter component 512, which may include, for example, an RF transmitter for transmitting the signals described herein. In an aspect, the receiver component 510 and the transmitter component 512 may be co-located in a transceiver such as illustrated by the TX/RX 318 in FIG. 3.

As discussed briefly above with respect to FIG. 1, the scheduler component 198 may include the configuration component 542, the DCI generator 544, and the RV determination component 546. The scheduler component 198 may also include the decoder 548 and/or the encoder 549.

The configuration component 542 may transmit a format configuration 520 that configures a DCI format (e.g., DCI format 0_2 and/or DCI format 1_2) to include a single bit for a redundancy version field 530. In a first aspect, the configuration component 542 may also transmit an RRC message 522 indicating selectable redundancy versions. In some implementations, the RRC message 522 may be the same message as the format configuration 520 (e.g., a single RRC message including different information elements). In a second aspect, a fixed redundancy version sequence may be utilized. For example, the fixed redundancy version sequence may be defined in a standards document or regulation, or may be indicated via system information. In some implementations, either the format configuration 520 or the RRC message 522 may include an indication of a number of repetitions.

The DCI generator 544 may transmit (via the transmitter component 512) a DCI 524 that schedules a transmission. The DCI 524 may schedule a downlink transmission 526 using the DCI format 1_2 or schedule an uplink transmission 528 using the DCI format 0_2. The DCI 524 may include an RV field 530 that is a single bit. Accordingly, the RV field 530 may indicate one of two possible values.

The RV determination component 546 may determine the value of the RV field 530. For example, the RV determination component 546 may determine the value of the RV field 530 based on a HARQ process for the transmission. For instance, a first RV value (e.g., RV0) may be used for initial transmissions and a second RV value (e.g., RV2 or RV3) may be used for retransmissions.

As discussed above, the UE 104 or the redundancy component 140 may include the configuration component 141, the DCI detector 142, and the RV selection component 144. The redundancy component 140 may also include the decoder 146 and/or the encoder 145. The UE 104 may include a receiver component 570, which may include, for example, a RF receiver for receiving the signals described herein. The UE 104 or the redundancy component 140 may include a transmitter component 572, which may include, for example, an RF transmitter for transmitting the signals described herein. In an aspect, the receiver component 570 and the transmitter component 572 may be co-located in a transceiver such as illustrated by the TX/RX 354 in FIG. 3.

Figure 6:
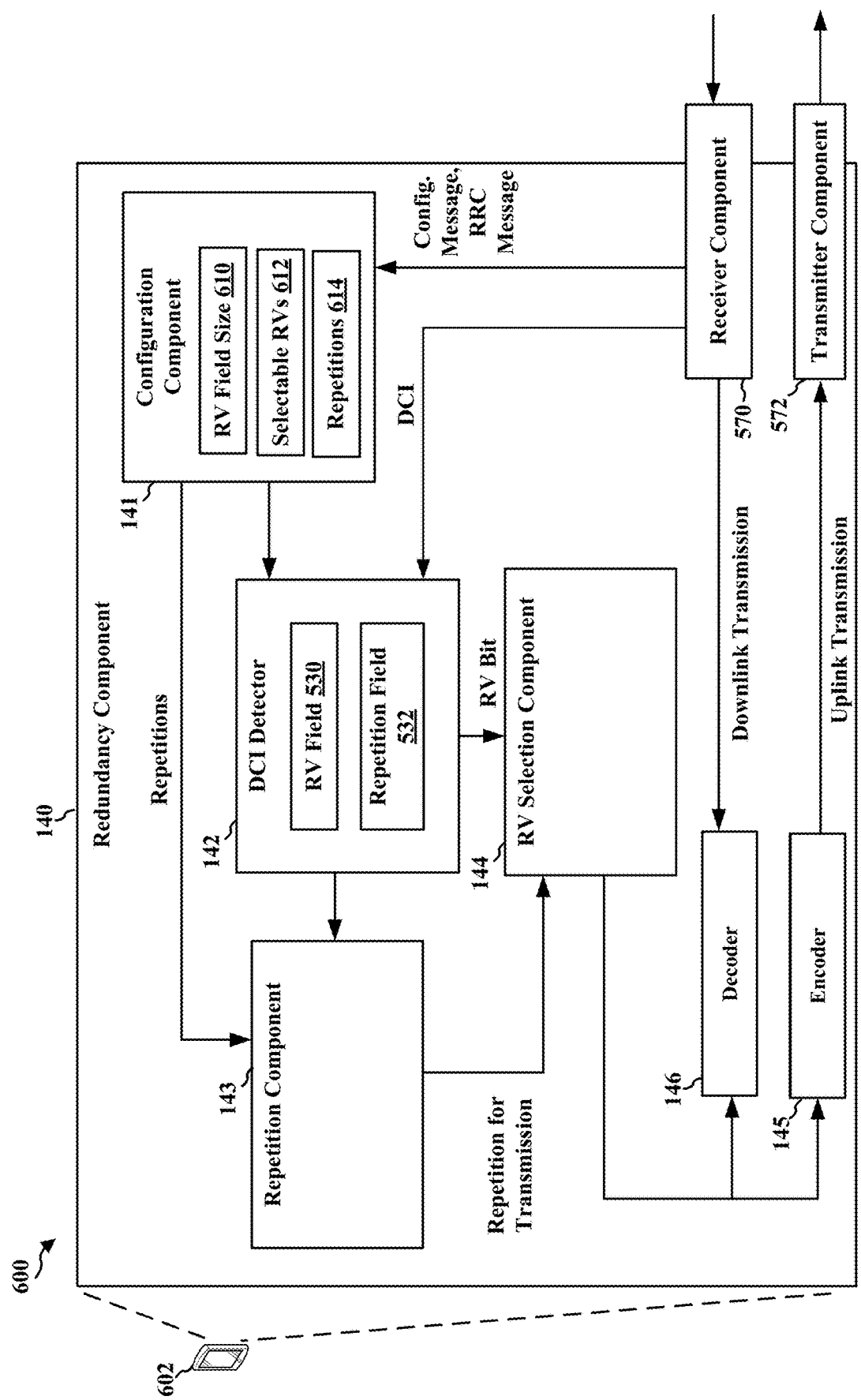
FIG. 6 is a conceptual data flow diagram illustrating an example data flow between different means/components in an example UE including a redundancy component.

FIG. 6 is a conceptual data flow diagram 600 illustrating the data flow between different means/components in an example UE 602, which may be an example of the UE 104 (or UE 350) including the redundancy component 140 with reference to FIGS. 1, 3, and 5.

The receiver component 570 may receive various signals including the format configuration 520, RRC message 522, DCI 524, and downlink transmission 526. The receiver component 570 may provide the format configuration 520 and/or the RRC message 522 to the configuration component 141. The receiver component 570 may provide PDCCH candidates potentially carrying the DCI 524 to the DCI detector 142. The receiver component 570 may provide the downlink transmission 526 to the decoder 146.

The configuration component 141 may receive the format configuration 520 and/or the RRC message 522. The configuration component 141 may extract configuration parameters from the format configuration 520. For example, the configuration component 141 may extract an RV field size 610 from the format configuration 520. The configuration component 141 may extract the selectable RVs 612 or the repetitions 614 from the RRC message 522. The configuration component 141 may provide the RV field size 610 to the DCI detector 142. The configuration component 141 may provide the selectable RVs 612 to the RV selection component 144. The configuration component 141 may provide the repetitions 614 to the repetition component 143.

The DCI detector 142 may receive the PDCCH candidates that potentially carry the DCI 524 from the receiver component 570. The DCI detector 142 may receive the DCI format configuration including the RV field size 610 from the configuration component 141. The DCI detector 142 may perform blind detection on the PDCCH candidates to determine whether the PDCCH candidates carry the DCI 524. If the DCI 524 is detected, the DCI detector 142 may extract varies fields from the DCI 524 including the RV field 530 and optionally the repetition field 532. The DCI detector 142 may provide the RV field 530 to the RV selection component 144. The DCI detector 142 may provide the repetition field 532 to the repetition component 143.

The repetition component 143 may receive the repetitions 614 from the configuration component 141 and/or receive the repetition field 532 from the DCI detector 142. The repetition component 143 may determine, for each transmission, whether the transmission is to be transmitted with repetitions. For example, the repetition component 143 may determine that the transmission is to be transmitted with repetitions when the configured repetitions 614 for the type of transmission (PUSCH or PDSCH) is greater than 1 or when the repetition field 532 indicates a number of repetitions greater than 1. The repetition component 143 may provide an indication of repetition for the transmission to the RV selection component 144.

The RV selection component 144 may receive the RV bit of the RV field 530 from the DCI detector 142. The RV selection component 144 may receive the selectable RVs 612 from the configuration component 141. The RV selection component 144 may receive the repetition for transmission from the repetition component 143. The RV selection component 144 may determine the RV for the transmission based on the RV bit and either the selectable RVs 612 or the indication of repetition for the transmission. For instance, the value of the RV bit may map to one of the selectable RVs 612. As another example, the RV selection component 144 may select a RV sequence for repetition when the repetition for transmission is indicated, or select a RV sequence for single transmission when the repetition for transmission is not indicated. The RV selection component 144 may provide the RV to either the decoder 146 or the encoder 145 depending on the direction of the transmission.

The encoder 145 may receive the RV from the RV selection component 144. The encoder 145 may include the circular buffer 410. The encoder 145 may select bits for an uplink transmission at a starting point indicated by the RV. The encoder 145 may provide the selected bits to the transmitter component 572.

The decoder 146 may receive the RV from the RV selection component 144. The decoder 146 may receive a downlink transmission 526 such as a PDSCH from the receiver component 570. The decoder 146 may decode the downlink transmission based on the RV. For example, the decoder 146 may combine the downlink transmission with another transmission based on the RV.

Figure 7:
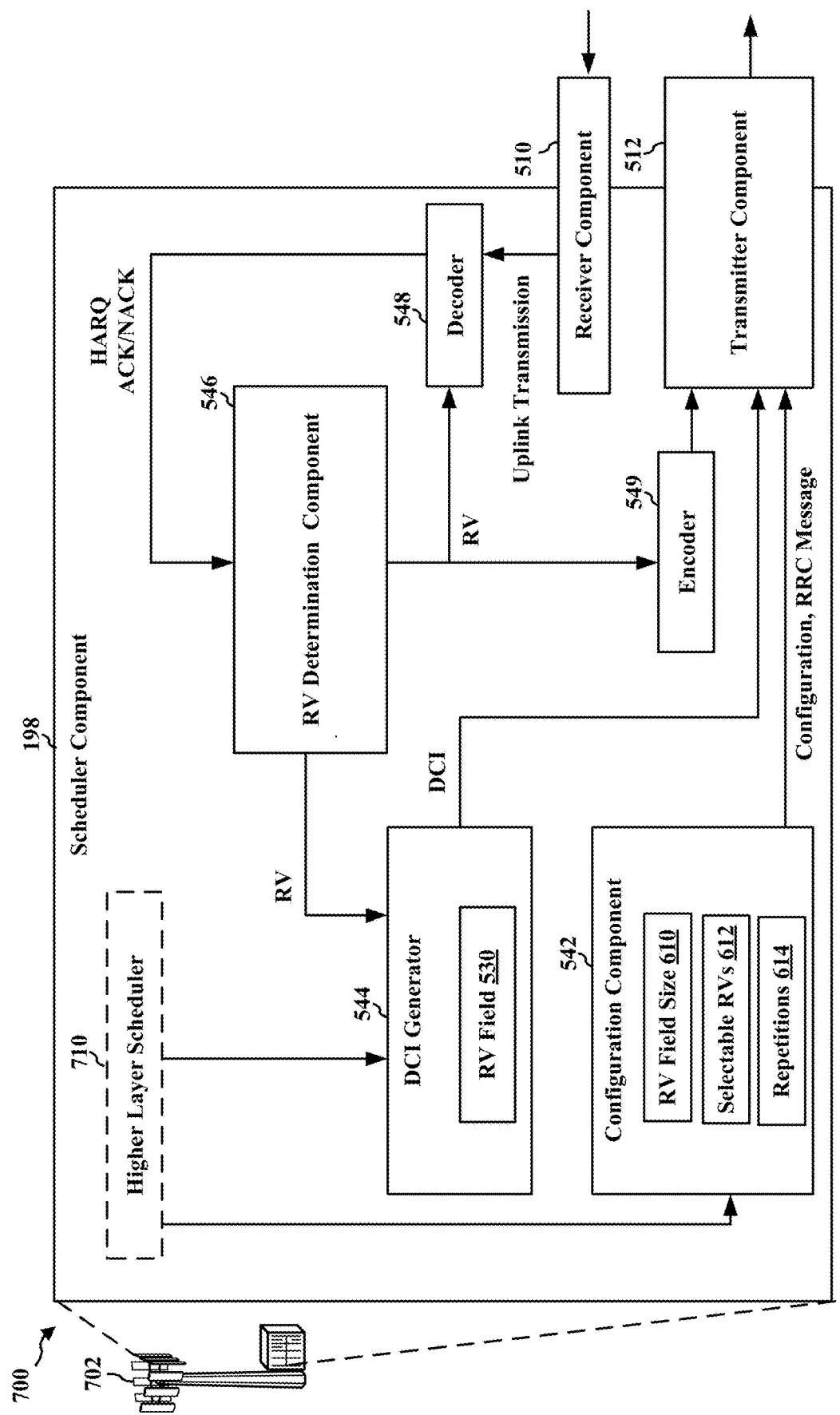
FIG. 7 is a conceptual data flow diagram illustrating an example data flow between different means/components in an example base station including a scheduling component.

FIG. 7 is a conceptual data flow diagram 700 illustrating the data flow between different means/components in an example base station 702, which may be an example of the base station 102 (or base station 310) and include the scheduler component 198 with reference to FIGS. 1, 3, and 5.

The scheduler component 198 may include a higher layer scheduler 710 that determines transmissions for one or more UEs 104. The higher layer scheduler 710 may control the configuration component 542 and the DCI generator 544 to transmit messages and indicators to the UEs 104 to schedule the transmissions.

The configuration component 542 may generate the format configuration 520. As discussed above, the format configuration 520 may include the format parameters including the RV field size 610. The configuration component 542 may generate the RRC message 522. As discussed above, the RRC message 522 may include the selectable RVs 612 or the repetitions 614. The configuration component 542 may transmit the format configuration 520 and/or the RRC message 522 via the transmitter component 512.

The DCI generator 544 may generate the DCI 524. As discussed above, the DCI 524 may include the RV field 530, which may be a single bit. The DCI generator 544 may transmit the DCI 524 via the transmitter component 512.

The RV determination component 546 may determine an RV for a transmission. The RV determination component 546 may receive a HARQ ACK/NACK from the decoder 548. The HARQ ACK/NACK may be determined by the decoder 548 for uplink transmissions or may be received in uplink control information (UCI) for downlink transmission. The RV determination component 546 may determine whether a transmission is a retransmission. The RV determination component 546 may select an RV for a retransmission for combination with a previous transmission or for self-decoding according to the configuration parameters. The RV determination component 546 may provide the RV to the DCI generator 544. The RV determination component 546 may also provide the RV to the decoder 548 or the encoder 549 depending on the direction of the transmission.

The decoder 548 may receive an uplink transmission from the receiver component 510. The decoder 548 may decode the uplink transmission based on the RV.

The encoder 549 may include the circular buffer 410. The encoder 549 may select bits for the transmission from the circular buffer 410 according to the RV. The encoder 549 may transmit the selected bits via the transmitter component 512.

Figure 8:
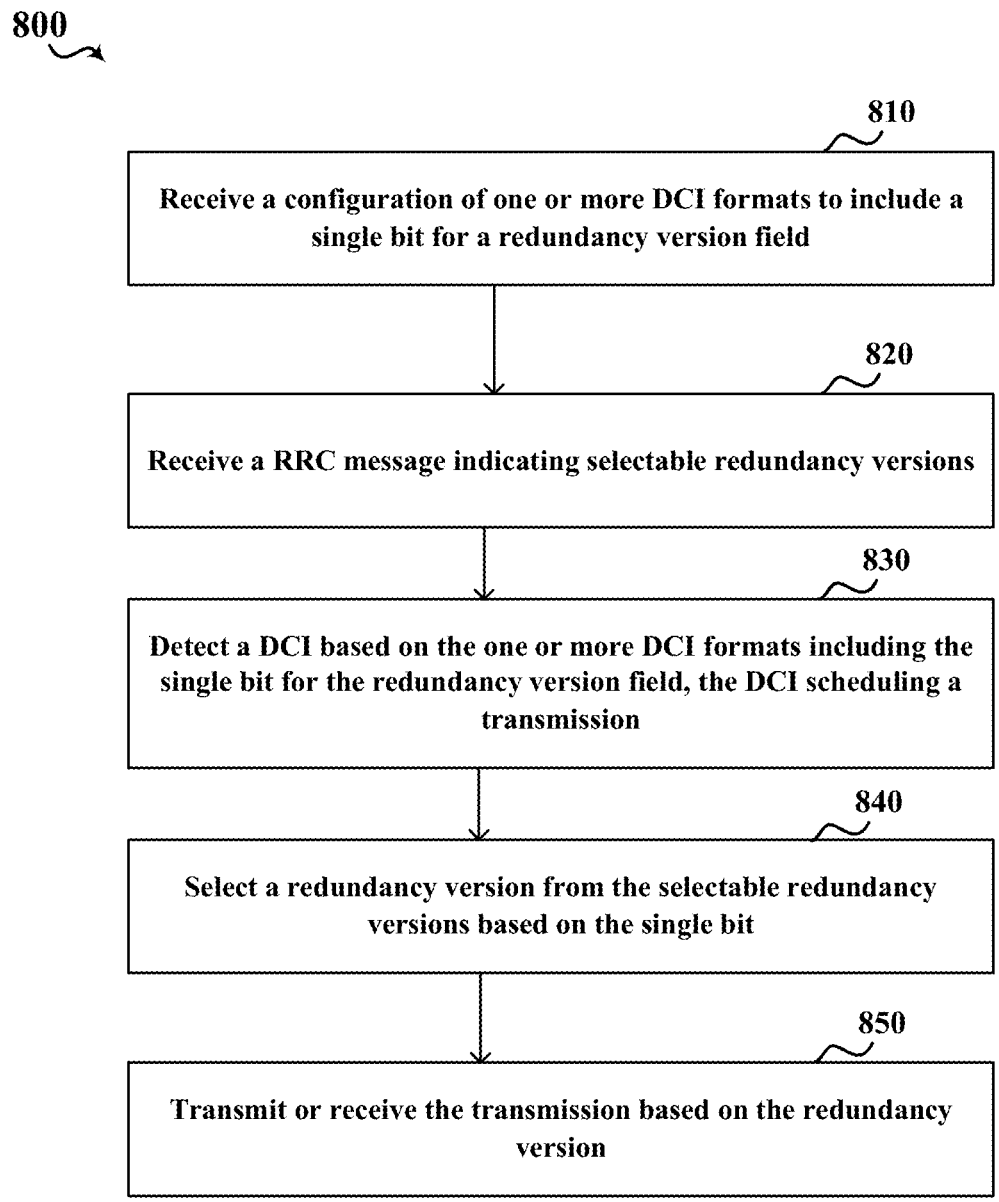
FIG. 8 is a flowchart of an example of a method for a UE to determine a redundancy version for a transmission based on selectable redundancy versions.

FIG. 8 is a flowchart of an example method 800 for selecting a redundancy version for a transmission. The method 800 may be performed by a UE (such as the UE 104, which may include the memory 360 and which may be the entire UE 104 or a component of the UE 104 such as the redundancy component 140, TX processor 368, the RX processor 356, or the controller/processor 359). The method 800 may be performed by the redundancy component 140 in communication with the scheduler component 198 of the base station 102.

At block 810, the method 800 may include receiving a configuration of one or more DCI formats to include a single bit for a redundancy version field. In an aspect, for example, the UE 104, the RX processor 356 and/or the controller/processor 359 may execute redundancy component 140 and/or the configuration component 141 to receive, via TX/RX 354, a configuration of one or more DCI formats to include a single bit for a redundancy version field 530. For example, the configuration component 141 may receive the format configuration 520 as an RRC message. Accordingly, the UE 104, the RX processor 356, and/or the controller/processor 359 executing the redundancy component 140 and/or the configuration component 141 may provide means for receiving a configuration of one or more DCI formats to include a single bit for a redundancy version field.

At block 820, the method 800 may include receiving a RRC message indicating selectable redundancy versions. In an aspect, for example, the UE 104, the RX processor 356 and/or the controller/processor 359 may execute redundancy component 140 and/or the configuration component 141 to receive, via TX/RX 354, a RRC message 522 indicating selectable redundancy versions. In some implementations, the RRC message 522 indicates different selectable redundancy versions for an uplink DCI format and for a downlink DCI format. For instance, the RRC message 522 may include two sets of parameters. In some implementations, the selectable redundancy versions include redundancy version 0 and one of redundancy version 2 or redundancy version 3. For instance, a first set of selectable redundancy versions may be the set [0, 2] and a second set of selectable redundancy versions may be the set [0, 3]. In some implementations, the RRC message 522 indicates different selectable redundancy versions based on a priority of scheduled data for the transmission scheduled by the DCI. For example, the UE 104 may select the set [0, 2] for high priority uplink transmissions and select the set [0, 3] for low priority uplink transmissions. A first priority (e.g., high priority) may be associated with a first channel coding rate and a second priority (e.g., low priority) may be associated with a second channel coding rate. Additionally, the reliability of a grant (e.g., DCI 524) for the first priority may be different than a reliability of a grant for the second priority. Accordingly, the UE 104, the RX processor 356, and/or the controller/processor 359 executing the redundancy component 140 and/or the configuration component 141 may provide means for receiving a RRC message indicating selectable redundancy versions.

At block 830, the method 800 may include detecting a DCI based on the one or more DCI formats including the single bit for the redundancy version field, the DCI scheduling a transmission. In an aspect, for example, the UE 104, the RX processor 356 and/or the controller/processor 359 may execute redundancy component 140 and/or DCI detector 142 to detect a DCI based on the one or more DCI formats including the single bit for the redundancy version field, the DCI scheduling a transmission. For example, the DCI detector 142 may perform blind decoding on PDCCH candidates to detect the DCI. Accordingly, the UE 104, the RX processor 356, and/or the controller/processor 359 executing the redundancy component 140 and/or the DCI detector 142 may provide means for detecting a DCI based on the one or more DCI formats including the single bit for the redundancy version field, the DCI scheduling a transmission.

At block 840, the method 800 may include selecting a redundancy version from the selectable redundancy versions based on the single bit. In an aspect, for example, the UE 104, the RX processor 356 and/or the controller/processor 359 may execute redundancy component 140 and/or the RV selection component 144 to select a redundancy version from the selectable redundancy versions based on the single bit. For instance, the RV selection component 144 may map a value of 0 in the RV field 530 to a first RV in the selectable redundancy versions and map a value of 1 in the RV field 530 to a second RV in the selectable redundancy versions. For instance, if the RV field 530 includes the value 0, the RV selection component 144 may select RV0 and if the RV field 530 includes the value 1, the RV selection component 144 may select RV2 or RV3 depending on the selectable redundancy versions configured by the RRC message 522. Accordingly, the UE 104, the RX processor 356, and/or the controller/processor 359 executing the redundancy component 140 and/or the RV selection component 144 may provide means for selecting a redundancy version from the selectable redundancy versions based on the single bit.

At block 850, the method 800 may include transmitting or receiving the transmission based on the redundancy version. In an aspect, for example, the UE 104, the RX processor 356 and/or the controller/processor 359 may execute redundancy component 140 and/or the encoder 145 to transmit, via TX/RX 354, the transmission based on the redundancy version or execute redundancy component 140 and/or the decoder 146 to receive, via TX/RX 354, the transmission based on the redundancy version. For instance, the encoder 145 may select bits from the circular buffer 410 for a PUSCH transmission based on the redundancy version. As another example, for a downlink transmission, the decoder 146 may perform IR-HARQ combining or self-decoding of a PDSCH based on the redundancy version. Accordingly, the UE 104, the RX processor 356, and/or the controller/processor 359 executing the redundancy component 140, the encoder 145 and/or the decoder 146 may provide means for transmitting the transmission based on the redundancy version or means for receiving the transmission based on the redundancy version.

Figure 9:
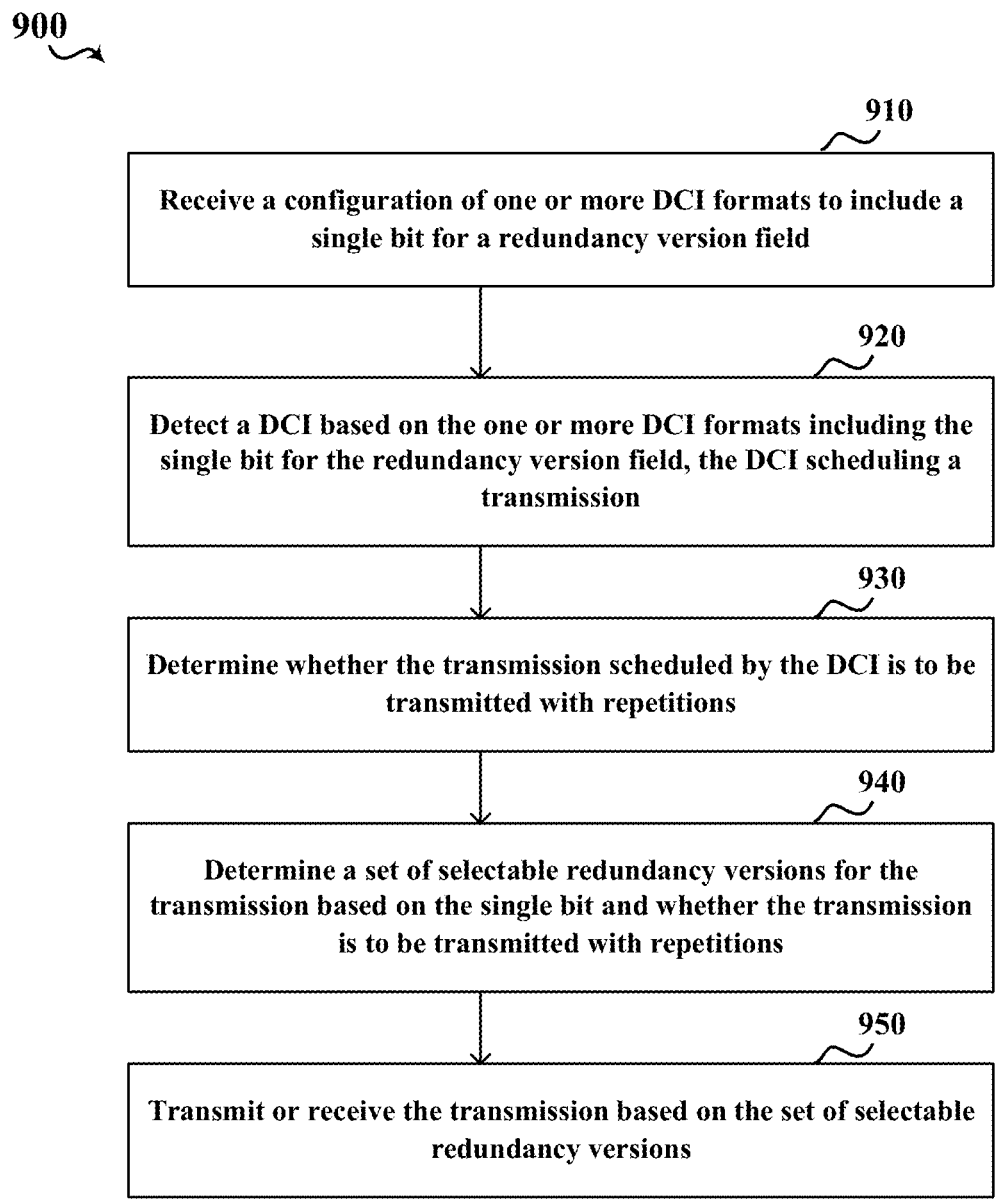
FIG. 9 is a flowchart of an example of a method for a UE to determine a redundancy version for a transmission based on a sequence of redundancy versions.

FIG. 9 is a flowchart of an example method 900 for selecting a redundancy version for a transmission. The method 900 may be performed by a UE (such as the UE 104, which may include the memory 360 and which may be the entire UE 104 or a component of the UE 104 such as the redundancy component 140, TX processor 368, the RX processor 356, or the controller/processor 359). The method 900 may be performed by the redundancy component 140 in communication with the scheduler component 198 of the base station 102.

At block 910, the method 900 may include receiving a configuration of one or more DCI formats to include a single bit for a redundancy version field. In an aspect, for example, the UE 104, the RX processor 356 and/or the controller/processor 359 may execute redundancy component 140 and/or the configuration component 141 to receive, via TX/RX 354, a configuration of one or more DCI formats to include a single bit for a redundancy version field 530. For example, the configuration component 141 may receive the format configuration 520 as an RRC message. Accordingly, the UE 104, the RX processor 356, and/or the controller/processor 359 executing the redundancy component 140 and/or the configuration component 141 may provide means for receiving a configuration of one or more DCI formats to include a single bit for a redundancy version field.

At block 920, the method 900 may include detecting a DCI based on the one or more DCI formats including the single bit for the redundancy version field, the DCI scheduling a transmission. In an aspect, for example, the UE 104, the RX processor 356 and/or the controller/processor 359 may execute redundancy component 140 and/or DCI detector 142 to detect a DCI based on the one or more DCI formats including the single bit for the redundancy version field, the DCI scheduling a transmission. For example, the DCI detector 142 may perform blind decoding on PDCCH candidates to detect the DCI. Accordingly, the UE 104, the RX processor 356, and/or the controller/processor 359 executing the redundancy component 140 and/or the DCI detector 142 may provide means for detecting a DCI based on the one or more DCI formats including the single bit for the redundancy version field, the DCI scheduling a transmission.

At block 930, the method 900 may include determining whether the transmission scheduled by the DCI is to be transmitted with repetitions. In an aspect, for example, the UE 104, the RX processor 356 and/or the controller/processor 359 may execute redundancy component 140 and/or the repetition component 143 to determine whether the transmission scheduled by the DCI is to be transmitted with repetitions. For example, a number of repetitions may be configured via a RRC message including an information element for a PUSCH aggregation factor or a PDSCH aggregation factor, or the number of repetitions may be indicated in a DCI via a number of repetitions parameter for PUSCH. Accordingly, the UE 104, the RX processor 356, and/or the controller/processor 359 executing the redundancy component 140 and/or the repetition component 143 may provide means for determining whether the transmission scheduled by the DCI is to be transmitted with repetitions.

At block 940, the method 900 may include determining a set of selectable redundancy versions for the transmission based on the single bit and whether the transmission is to be transmitted with repetitions. In an aspect, for example, the UE 104, the RX processor 356 and/or the controller/processor 359 may execute redundancy component 140 and/or the RV selection component 144 to determine a set of selectable redundancy versions for the transmission based on the single bit and whether the transmission is to be transmitted with repetitions. In some implementations, determining the set of selectable redundancy versions is further based on a priority of scheduled data for the transmission. For example, if the priority level (i.e., the physical layer priority) of the UL transmission is 0, then the RV selection component 144 may select a first RV sequence (e.g., RV [0,3]) and if the priority level of the UL transmission is 1, then the RV selection component 144 may select a second RV sequence (e.g., RV [0,2]). If the transmission/reception is scheduled with repetitions, then the UE uses RV0 or RV3 as the RV of the first repetition of the repetitions associated with the transmission/reception. That is, the set of selectable RVs are RV 0 and 3. If the transmission/reception is not scheduled with repetitions, then the UE uses RV0 or RV2 as the RV for the transmission/reception. That is the set of selectable RVs are RV0 and RV2. The first priority may be associated with a first channel coding rate and a second priority may be associated with a second channel coding rate. In some implementations, determining the set of selectable redundancy versions for the transmission based on the single bit and whether the transmission is to be transmitted with repetitions includes: determining a first set of selectable redundancy versions if the transmission is to be transmitted with repetitions; determining a second set of selectable redundancy versions if the transmission is not to be transmitted with repetitions; and determining a starting redundancy version from the set of selectable redundancy versions based on the single bit. Accordingly, the UE 104, the RX processor 356, and/or the controller/processor 359 executing the redundancy component 140 and/or the RV selection component 144 may provide means for determining a set of selectable redundancy versions for the transmission based on the single bit and whether the transmission is to be transmitted with repetitions.

At block 950, the method 900 may include transmitting or receiving the transmission based on the redundancy version. In an aspect, for example, the UE 104, the RX processor 356 and/or the controller/processor 359 may execute redundancy component 140 and/or the encoder 145 to transmit, via TX/RX 354, the transmission based on the redundancy version or execute redundancy component 140 and/or the decoder 146 to receive the transmission based on the redundancy version. For instance, the encoder 145 may select bits from the circular buffer 410 for a PUSCH transmission based on the redundancy version. As another example, for a downlink transmission, the decoder 146 may perform IR-HARQ combining or self-decoding of a PDSCH based on the redundancy version. Accordingly, the UE 104, the RX processor 356, and/or the controller/processor 359 executing the redundancy component 140, the encoder 145, and/or the decoder 146 may provide means for transmitting the transmission based on the redundancy version or means for receiving the transmission based on the redundancy version.

Figure 10:
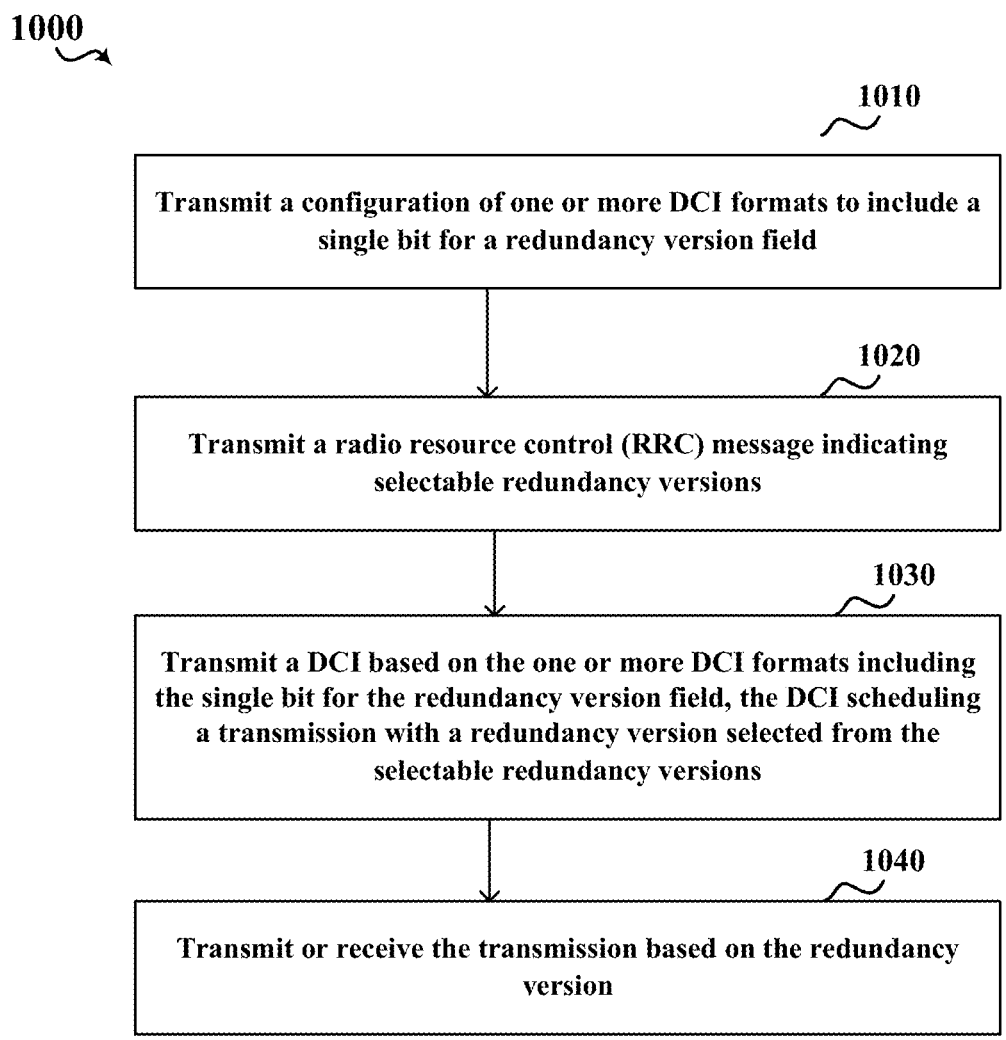
FIG. 10 is a flowchart of an example method for a base station to schedule a transmission with a redundancy version based on selectable redundancy versions.

FIG. 10 is a flowchart of an example method 1000 for scheduling transmissions with a redundancy version based on a single bit RV field. The method 1000 may be performed by a base station (such as the base station 102, which may include the memory 376 and which may be the entire base station 102 or a component of the base station 102 such as the scheduler component 198, TX processor 316, the RX processor 370, or the controller/processor 375). The method 1000 may be performed by the scheduler component 198 in communication with the redundancy component 140 of the UE 104.

At block 1010, the method 1000 may include transmitting a configuration of one or more DCI formats to include a single bit for a redundancy version field. In an aspect, for example, the controller/processor 375, and/or the TX processor 316 may execute the scheduler component 198 and/or the configuration component 542 to transmit, via TX/RX 318, a configuration of one or more DCI formats to include a single bit for a redundancy version field 530. For example, the configuration component 542 may transmit the format configuration 520 as an RRC message. Accordingly, the base station 102, the controller/processor 375, and/or the TX processor 316 executing the scheduler component 198 and/or the configuration component 542 may provide means for transmitting a configuration of one or more DCI formats to include a single bit for a redundancy version field.

At block 1020, the method 1000 may include transmitting a RRC message indicating selectable redundancy versions. In an aspect, for example, the controller/processor 375, and/or the TX processor 316 may execute the scheduler component 198 and/or the configuration component 542 to transmit, via TX/RX 318, the RRC message 522 indicating selectable redundancy versions. In some implementations, the RRC message 522 indicates different selectable redundancy versions for an uplink DCI format and for a downlink DCI format. For instance, the RRC message 522 may include two sets of parameters. In some implementations, the selectable redundancy versions include redundancy version 0 and one of redundancy version 2 or redundancy version 3. For instance, a first set of selectable redundancy versions may be the set [0, 2] and a second set of selectable redundancy versions may be the set [0, 3]. In some implementations, the RRC message 522 indicates different selectable redundancy versions based on a priority of scheduled data for the transmission scheduled by the DCI. For example, the RRC message 522 may indicate multiple sets of selectable redundancy versions and allow the UE 104 to select a set based on the priority of an uplink transmission. A first priority (e.g., high priority) may be associated with a first channel coding rate and a second priority (e.g., low priority) may be associated with a second channel coding rate. Additionally, the reliability of a grant (e.g., DCI 524) for the first priority may be different than a reliability of a grant for the second priority. Accordingly, the base station 102, the controller/processor 375, and/or the TX processor 316 executing the scheduler component 198 and/or the configuration component 542 may provide means for transmitting a RRC message indicating selectable redundancy versions.

At block 1030, the method 1000 may include transmitting a DCI based on the one or more DCI formats including the single bit for the redundancy version field, the DCI scheduling a transmission with a redundancy version selected from the selectable redundancy versions. In an aspect, for example, the controller/processor 375, and/or the TX processor 316 may execute the scheduler component 198 and/or the DCI generator 544 to transmit, via TX/RX 318, a DCI 524 based on the one or more DCI formats including the single bit for the redundancy version field 530. The DCI 524 may schedule a transmission (e.g., downlink transmission 526 or uplink transmission 528) with a redundancy version selected from the selectable redundancy versions. Accordingly, the base station 102, the controller/processor 375, and/or the TX processor 316 executing the scheduler component 198 and/or the DCI generator 544 may provide means for transmitting a DCI based on the one or more DCI formats including the single bit for the redundancy version field, the DCI scheduling a transmission with a redundancy version selected from the selectable redundancy versions.

At block 1040, the method 1000 may include transmitting or receiving the transmission based on the redundancy version. In an aspect, for example, the controller/processor 375, and/or the TX processor 316 may execute the scheduler component 198 and/or the encoder 549 to transmit the downlink transmission 526 based on the redundancy version or execute scheduler component 198 and/or the decoder 548 to receive, via TX/RX 318, the uplink transmission 528 based on the redundancy version. For instance, the encoder 549 may select bits from the circular buffer 410 for a PUSCH transmission based on the redundancy version. As another example, for an uplink transmission, the decoder 548 may perform IR-HARQ combining or self-decoding of a PUSCH based on the redundancy version. Accordingly, the base station 102, the controller/processor 375, and/or the TX processor 316 executing the scheduler component 198, the encoder 549, and/or the decoder 548 may provide means for transmitting the transmission based on the redundancy version or means for receiving the transmission based on the redundancy version.

FIG. 11 is a flowchart of an example method 1100 for scheduling transmissions with a redundancy version based on a single bit RV field. The method 1100 may be performed by a base station (such as the base station 102, which may include the memory 376 and which may be the entire base station 102 or a component of the base station 102 such as the scheduler component 198, TX processor 316, the RX processor 370, or the controller/processor 375). The method 1100 may be performed by the scheduler component 198 in communication with the redundancy component 140 of the UE 104.

At block 1110, the method 1100 may include transmitting a configuration of one or more DCI formats to include a single bit for a redundancy version field. In an aspect, for example, the controller/processor 375, and/or the TX processor 316 may execute the scheduler component 198 and/or the configuration component 542 to transmit, via TX/RX 318, a configuration of one or more DCI formats to include a single bit for a redundancy version field 530. For example, the configuration component 542 may transmit the format configuration 520 as an RRC message. Accordingly, the base station 102, the controller/processor 375, and/or the TX processor 316 executing the scheduler component 198 and/or the configuration component 542 may provide means for transmitting a configuration of one or more DCI formats to include a single bit for a redundancy version field.

At block 1120, the method 1100 may include determining a single bit that indicates a set of selectable redundancy versions for a transmission based on whether the transmission is to be transmitted with repetitions. In an aspect, for example, the controller/processor 375, and/or the TX processor 316 may execute the scheduler component 198 and/or the configuration component 542 to determine a single bit that indicates a set of selectable redundancy versions for a transmission based on whether the transmission is to be transmitted with repetitions. In some implementations, determining the single bit that indicates the set of selectable redundancy versions is further based on a priority of scheduled data for the transmission. A first priority may be associated with a first channel coding rate and a second priority may be associated with a second channel coding rate. In some implementations, determining the single bit that indicates the set of selectable redundancy versions for the transmission based on whether the transmission is to be transmitted with repetitions includes: determining a first set of selectable redundancy versions if the transmission is to be transmitted with repetitions; determining a second set of selectable redundancy versions if the transmission is not to be transmitted with repetitions; and determining a start position within the set of selectable redundancy versions based on the single bit. Accordingly, the base station 102, the controller/processor 375, and/or the TX processor 316 executing the scheduler component 198 and/or the configuration component 542 may provide means for determining a single bit that indicates a set of selectable redundancy versions for a transmission based on whether the transmission is to be transmitted with repetitions.

At block 1130, the method 1100 may include transmitting a DCI based on the one or more DCI formats including the single bit for the redundancy version field, the DCI scheduling a transmission with a redundancy version for each repetition selected according to the set of selectable redundancy versions. In an aspect, for example, the controller/processor 375, and/or the TX processor 316 may execute the scheduler component 198 and/or the DCI generator 544 to transmit, via TX/RX 318, a DCI 524 based on the one or more DCI formats including the single bit for the redundancy version field 530. The DCI 524 may the DCI schedule the transmission with a redundancy version for each repetition selected according to the set of selectable redundancy versions. Accordingly, the base station 102, the controller/processor 375, and/or the TX processor 316 executing the scheduler component 198 and/or the indicator generator 544 may provide means for transmitting a DCI based on the one or more DCI formats including the single bit for the redundancy version field, the DCI scheduling a transmission with a redundancy version for each repetition selected according to the set of selectable redundancy versions.

At block 1140, the method 1100 may include indicating whether the transmission scheduled by the DCI is to be transmitted with repetitions. In an aspect, for example, the controller/processor 375, and/or the TX processor 316 may execute the scheduler component 198, the configuration component 141 and/or the DCI generator 544 to indicate whether the transmission scheduled by the DCI is to be transmitted with repetitions. For example, the configuration component 141 may transmit a RRC message including an information element for a PUSCH aggregation factor or a PDSCH aggregation factor, or the DC generator 544 may transmit a DCI including a number of repetitions parameter for PUSCH. Accordingly, the base station 102, the controller/processor 375, and/or the TX processor 316 executing the scheduler component 198 and/or the indicator generator 544 may provide means for indicating whether the transmission scheduled by the DCI is to be transmitted with repetitions.

At block 1150, the method 1100 may include transmitting or receiving the transmission based on the redundancy version. In an aspect, for example, the controller/processor 375, and/or the TX processor 316 may execute the scheduler component 198 and/or the encoder 549 to transmit, via TX/RX 318, the downlink transmission 526 based on the redundancy version or execute scheduler component 194 and/or the decoder 548 to receive the uplink transmission 528 based on the redundancy version. For instance, the encoder 549 may select bits from the circular buffer 410 for a PUSCH transmission based on the redundancy version. As another example, for an uplink transmission, the decoder 548 may perform IR-HARQ combining or self-decoding of a PUSCH based on the redundancy version. Accordingly, the base station 102, the controller/processor 375, and/or the TX processor 316 executing the scheduler component 198, the encoder 549, and/or the decoder 548 may provide means for transmitting the transmission based on the redundancy version or means for receiving the transmission based on the redundancy version.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

Some Further Example Clauses

Implementation examples are described in the following numbered clauses:
1. A method of wireless communication, comprising:
   receiving a configuration of one or more downlink control information (DCI) formats to include a single bit for a redundancy version field;
   receiving a radio resource control (RRC) message indicating selectable redundancy versions;
   detecting a DCI based on the one or more DCI formats including the single bit for the redundancy version field, the DCI scheduling a transmission;
   selecting a redundancy version from the selectable redundancy versions based on the single bit; and
   transmitting or receiving the transmission based on the redundancy version.
2. The method of clause 1, wherein the RRC message indicates different selectable redundancy versions for an uplink DCI format and for a downlink DCI format.
3. The method of clause 1 or 2, wherein the selectable redundancy versions include redundancy version 0 and one of redundancy version 2 or redundancy version 3.
4. The method of any of clauses 1-3, wherein the RRC message indicates different selectable redundancy versions based on a priority of scheduled data for the transmission scheduled by the DCI.
5. The method of clause 4, wherein a first priority is associated with a first channel coding rate and a second priority is associated with a second channel coding rate.
6. A method of wireless communication, comprising:
   receiving a configuration of one or more downlink control information (DCI) formats to include a single bit for a redundancy version field;
   detecting a DCI based on the one or more DCI formats including the single bit for the redundancy version field, the DCI scheduling a transmission;
   determining whether the transmission scheduled by the DCI is to be transmitted with repetitions;
   determining a set of selectable redundancy versions for the transmission based on the single bit and whether the transmission is to be transmitted with repetitions; and
   transmitting or receiving the transmission based on the set of selectable redundancy versions.
7. The method of clause 6, wherein determining the set of selectable redundancy versions is further based on a priority of scheduled data for the transmission.
8. The method of clause 7, wherein a first priority is associated with a first channel coding rate and a second priority is associated with a second channel coding rate.
9. The method of any of clauses 6-8, wherein determining the set of selectable redundancy versions for the transmission based on the single bit and whether the transmission is to be transmitted with repetitions comprises:
   determining a first set of selectable redundancy versions if the transmission is to be transmitted with repetitions;
   determining a second set of selectable redundancy versions if the transmission is not to be transmitted with repetitions; and
   determining a start position within the determined set of selectable redundancy versions based on the single bit.
10. The method of any of clauses 6-9, wherein the set of selectable redundancy versions includes redundancy version 0 and one of redundancy version 2 or redundancy version 3.
11. A method of wireless communication, comprising:
   transmitting a configuration of one or more downlink control information (DCI) formats to include a single bit for a redundancy version field;
   transmitting a radio resource control (RRC) message indicating selectable redundancy versions;
   transmitting a DCI based on the one or more DCI formats including the single bit for the redundancy version field, the DCI scheduling a transmission with a redundancy version selected from the selectable redundancy versions; and
   transmitting or receiving the transmission based on the redundancy version.
12. The method of clause 11, wherein the RRC message indicates different selectable redundancy versions for an uplink DCI format and for a downlink DCI format.
13. The method of clause 11 or 12, wherein the selectable redundancy versions include redundancy version 0 and one of redundancy version 2 or redundancy version 3.
14. The method of any of clauses 11-13, wherein the RRC message indicates different selectable redundancy versions based on a priority of scheduled data for the transmission scheduled by the DCI.
15. The method of clause 14, wherein a first priority is associated with a first channel coding rate and a second priority is associated with a second channel coding rate.
16. A method of wireless communication, comprising:
   transmitting a configuration of one or more downlink control information (DCI) formats to include a single bit for a redundancy version field;
   determining a single bit that indicates a set of selectable redundancy versions for a transmission based on whether the transmission is to be transmitted with repetitions;
   transmitting a DCI based on the one or more DCI formats including the single bit for the redundancy version field, the DCI scheduling a transmission with a redundancy version for each repetition selected according to the set of selectable redundancy versions;
indicating whether the transmission scheduled by the DCI is to be transmitted with repetitions; and
transmitting or receiving the transmission based on the set of selectable redundancy versions.

17. The method of clause 16, wherein determining the single bit that indicates the set of selectable redundancy versions is further based on a priority of scheduled data for the transmission.

18. The method of clause 17, wherein a first priority is associated with a first channel coding rate and a second priority is associated with a second channel coding rate.

19. The method of any of clauses 16-19, wherein determining the single bit that indicates the set of selectable redundancy versions for the transmission based on whether the transmission is to be transmitted with repetitions comprises:
determining a first set of selectable redundancy versions if the transmission is to be transmitted with repetitions;
determining a second set of selectable redundancy versions if the transmission is not to be transmitted with repetitions; and
determining a starting redundancy version from the determined set of selectable redundancy versions based on the single bit.

20. The method of any of clauses 16-20, wherein the set of selectable redundancy versions includes redundancy version 0 and one of redundancy version 2 or redundancy version 3.

21. An apparatus for wireless communication at a user equipment (UE), comprising:
a memory storing computer-executable instructions;
a transceiver; and
at least one processor coupled to the memory and the transceiver and configured to execute the instructions to:
receive, via the transceiver, a configuration of one or more downlink control information (DCI) formats to include a single bit for a redundancy version field;
receive, via the transceiver, a radio resource control (RRC) message indicating selectable redundancy versions;
detect a DCI based on the one or more DCI formats including the single bit for the redundancy version field, the DCI scheduling a transmission;
select a redundancy version from the selectable redundancy versions based on the single bit; and
transmit or receive, via the transceiver, the transmission based on the redundancy version.

22. The apparatus of clause 21, wherein the RRC message indicates different selectable redundancy versions for an uplink DCI format and for a downlink DCI format.

23. The apparatus of clause 21 or 22, wherein the selectable redundancy versions include redundancy version 0 and one of redundancy version 2 or redundancy version 3.

24. The apparatus of any of clauses 21-23, wherein the RRC message indicates different selectable redundancy versions based on a priority of scheduled data for the transmission scheduled by the DCI.

25. The apparatus of clause 24, wherein a first priority is associated with a first channel coding rate and a second priority is associated with a second channel coding rate.

26. An apparatus for wireless communication at a user equipment (UE), comprising:
a memory storing computer-executable instructions;
a transceiver; and
at least one processor coupled to the memory and the transceiver and configured to execute the instructions to:
receive, via the transceiver, a configuration of one or more downlink control information (DCI) formats to include a single bit for a redundancy version field;
detect a DCI based on the one or more DCI formats including the single bit for the redundancy version field, the DCI scheduling a transmission;
determine whether the transmission scheduled by the DCI is to be transmitted with repetitions;
determine a set of selectable redundancy versions for the transmission based on the single bit and whether the transmission is to be transmitted with repetitions; and
transmit or receive, via the transceiver, the transmission based on the set of selectable redundancy versions.

27. The apparatus of clause 26, wherein determining the set of selectable redundancy versions is further based on a priority of scheduled data for the transmission.

28. The apparatus of clause 27, wherein a first priority is associated with a first channel coding rate and a second priority is associated with a second channel coding rate.

29. The apparatus of any of clauses 26-28, wherein the at least one processor is configured to:
determine a first set of selectable redundancy versions if the transmission is to be transmitted with repetitions;
determine a second set of selectable redundancy versions if the transmission is not to be transmitted with repetitions; and
determine a start position within the determined set of selectable redundancy versions based on the single bit.

30. The apparatus of any of clauses 26-29, wherein the set of selectable redundancy versions includes redundancy version 0 and one of redundancy version 2 or redundancy version 3.

31. An apparatus for wireless communication at a base station, comprising:
a memory storing computer-executable instructions;
a transceiver; and
at least one processor coupled to the memory and the transceiver and configured to execute the instructions to:
transmit, via the transceiver, a configuration of one or more downlink control information (DCI) formats to include a single bit for a redundancy version field;
transmit, via the transceiver, a radio resource control (RRC) message indicating selectable redundancy versions;
transmit, via the transceiver, a DCI based on the one or more DCI formats including the single bit for the redundancy version field, the DCI scheduling a transmission with a redundancy version selected from the selectable redundancy versions; and
transmit or receive, via the transceiver, the transmission based on the redundancy version.

32. The apparatus of clause 31, wherein the RRC message indicates different selectable redundancy versions for an uplink DCI format and for a downlink DCI format.

33. The apparatus of clause 31 or 32, wherein the selectable redundancy versions include redundancy version 0 and one of redundancy version 2 or redundancy version 3.

34. The apparatus of any of clauses 31-33, wherein the RRC message indicates different selectable redundancy versions based on a priority of scheduled data for the transmission scheduled by the DCI.

35. The apparatus of clause 34, wherein a first priority is associated with a first channel coding rate and a second priority is associated with a second channel coding rate.

36. An apparatus for wireless communication at a base station, comprising:
   a memory storing computer-executable instructions;
   a transceiver; and
   at least one processor coupled to the memory and the transceiver and configured to execute the instructions to:
      transmit, via the transceiver, a configuration of one or more downlink control information (DCI) formats to include a single bit for a redundancy version field;
      determine a single bit that indicates a set of selectable redundancy versions for a transmission based on whether the transmission is to be transmitted with repetitions;
      transmit, via the transceiver, a DCI based on the one or more DCI formats including the single bit for the redundancy version field, the DCI scheduling a transmission with a redundancy version for each repetition selected according to the set of selectable redundancy versions;
      indicate whether the transmission scheduled by the DCI is to be transmitted with repetitions; and
      transmit or receive the transmission based on the set of selectable redundancy versions.

37. The apparatus of clause 36, wherein the at least one processor is configured to determine the single bit that indicates the set of selectable redundancy versions based on a priority of scheduled data for the transmission.

38. The apparatus of clause 37, wherein a first priority is associated with a first channel coding rate and a second priority is associated with a second channel coding rate.

39. The apparatus of any of clauses 36-38, wherein the at least one processor is configured to:
   determine a first set of selectable redundancy versions if the transmission is to be transmitted with repetitions;
   determine a second set of selectable redundancy versions if the transmission is not to be transmitted with repetitions; and
   determine a starting redundancy version from the determined set of selectable redundancy versions based on the single bit.

40. The apparatus of any of clauses 36-39, wherein the set of selectable redundancy versions includes redundancy version 0 and one of redundancy version 2 or redundancy version 3.

41. An apparatus for wireless communication, comprising:
   means for receiving a configuration of one or more downlink control information (DCI) formats to include a single bit for a redundancy version field;
   means for receiving a radio resource control (RRC) message indicating selectable redundancy versions;
   means for detecting a DCI based on the one or more DCI formats including the single bit for the redundancy version field, the DCI scheduling a transmission;
   means for selecting a redundancy version from the selectable redundancy versions based on the single bit; and
   means for transmitting or receiving the transmission based on the redundancy version.

42. The apparatus of clause 41, wherein the RRC message indicates different selectable redundancy versions for an uplink DCI format and for a downlink DCI format.

43. The apparatus of clause 41 or 42, wherein the selectable redundancy versions include redundancy version 0 and one of redundancy version 2 or redundancy version 3.

44. The apparatus of any of clauses 41-43, wherein the RRC message indicates different selectable redundancy versions based on a priority of scheduled data for the transmission scheduled by the DCI.

45. The apparatus of clause 44, wherein a first priority is associated with a first channel coding rate and a second priority is associated with a second channel coding rate.

46. An apparatus for wireless communication, comprising:
   means for receiving a configuration of one or more downlink control information (DCI) formats to include a single bit for a redundancy version field;
   means for detecting a DCI based on the one or more DCI formats including the single bit for the redundancy version field, the DCI scheduling a transmission;
   means for determining whether the transmission scheduled by the DCI is to be transmitted with repetitions;
   means for determining a set of selectable redundancy versions for the transmission based on the single bit and whether the transmission is to be transmitted with repetitions; and
   means for transmitting or receiving the transmission based on the set of selectable redundancy versions.

47. The apparatus of clause 46, wherein determining the set of selectable redundancy versions is further based on a priority of scheduled data for the transmission.

48. The apparatus of clause 47, wherein a first priority is associated with a first channel coding rate and a second priority is associated with a second channel coding rate.

49. The apparatus of any of clauses 46-48, wherein the means for determining the set of selectable redundancy versions for the transmission based on the single bit and whether the transmission is to be transmitted with repetitions is configured to:
   determine a first set of selectable redundancy versions if the transmission is to be transmitted with repetitions;
   determine a second set of selectable redundancy versions if the transmission is not to be transmitted with repetitions; and
   determine a start position within the determined set of selectable redundancy versions based on the single bit.

50. The apparatus of any of clauses 46-49, wherein the set of selectable redundancy versions includes redundancy version 0 and one of redundancy version 2 or redundancy version 3.

51. A apparatus of wireless communication, comprising:
   means for transmitting a configuration of one or more downlink control information (DCI) formats to include a single bit for a redundancy version field;
   means for transmitting a radio resource control (RRC) message indicating selectable redundancy versions;
   means for transmitting a DCI based on the one or more DCI formats including the single bit for the redundancy version field, the DCI scheduling a transmission with a redundancy version selected from the selectable redundancy versions; and
   means for transmitting or receiving the transmission based on the redundancy version.

52. The apparatus of clause 51, wherein the RRC message indicates different selectable redundancy versions for an uplink DCI format and for a downlink DCI format.

53. The apparatus of clause 51 or 52, wherein the selectable redundancy versions include redundancy version 0 and one of redundancy version 2 or redundancy version 3.

54. The apparatus of any of clauses 51-53, wherein the RRC message indicates different selectable redundancy versions based on a priority of scheduled data for the transmission scheduled by the DCI.

55. The apparatus of clause 54, wherein a first priority is associated with a first channel coding rate and a second priority is associated with a second channel coding rate.

56. An apparatus for wireless communication, comprising:
   means for transmitting a configuration of one or more downlink control information (DCI) formats to include a single bit for a redundancy version field;
   means for determining a single bit that indicates a set of selectable redundancy versions for a transmission based on whether the transmission is to be transmitted with repetitions;
   means for transmitting a DCI based on the one or more DCI formats including the single bit for the redundancy version field, the DCI scheduling a transmission with a redundancy version for each repetition selected according to the set of selectable redundancy versions;
   means for indicating whether the transmission scheduled by the DCI is to be transmitted with repetitions; and
   means for transmitting or receiving the transmission based on the set of selectable redundancy versions.

57. The apparatus of clause 56, wherein the means for determining the single bit that indicates the set of selectable redundancy versions is configured to determine the set of selectable redundancy versions based on a priority of scheduled data for the transmission.

58. The apparatus of clause 57, wherein a first priority is associated with a first channel coding rate and a second priority is associated with a second channel coding rate.

59. The apparatus of any of clauses 56-58, wherein the means for determining the single bit that indicates the set of selectable redundancy versions for the transmission based on whether the transmission is to be transmitted with repetitions is configured to:
   determine a first set of selectable redundancy versions if the transmission is to be transmitted with repetitions;
   determine a second set of selectable redundancy versions if the transmission is not to be transmitted with repetitions; and
   determine a starting redundancy version from the determined set of selectable redundancy versions based on the single bit.

60. The apparatus of any of clauses 56-59, wherein the set of selectable redundancy versions includes redundancy version 0 and one of redundancy version 2 or redundancy version 3.

61. A non-transitory computer-readable medium storing computer executable code, the code when executed by a processor causes the processor to:
   receive a configuration of one or more downlink control information (DCI) formats to include a single bit for a redundancy version field;
   receive a radio resource control (RRC) message indicating selectable redundancy versions;
   detect a DCI based on the one or more DCI formats including the single bit for the redundancy version field, the DCI scheduling a transmission;
   select a redundancy version from the selectable redundancy versions based on the single bit; and
   transmit or receiving the transmission based on the redundancy version.

62. The non-transitory computer-readable medium of clause 61, wherein the RRC message indicates different selectable redundancy versions for an uplink DCI format and for a downlink DCI format.

63. The non-transitory computer-readable medium of clause 61 or 62, wherein the selectable redundancy versions include redundancy version 0 and one of redundancy version 2 or redundancy version 3.

64. The non-transitory computer-readable medium of any of clauses 61-63, wherein the RRC message indicates different selectable redundancy versions based on a priority of scheduled data for the transmission scheduled by the DCI.

65. The non-transitory computer-readable medium of clause 64, wherein a first priority is associated with a first channel coding rate and a second priority is associated with a second channel coding rate.

66. A non-transitory computer-readable medium storing computer executable code, the code when executed by a processor causes the processor to:
   receive a configuration of one or more downlink control information (DCI) formats to include a single bit for a redundancy version field;
   detect a DCI based on the one or more DCI formats including the single bit for the redundancy version field, the DCI scheduling a transmission;
   determine whether the transmission scheduled by the DCI is to be transmitted with repetitions;
   determine a set of selectable redundancy versions for the transmission based on the single bit and whether the transmission is to be transmitted with repetitions; and
   transmit or receive the transmission based on the set of selectable redundancy versions.

67. The non-transitory computer-readable medium of clause 66, wherein determining the set of selectable redundancy versions is further based on a priority of scheduled data for the transmission.

68. The non-transitory computer-readable medium of clause 67, wherein a first priority is associated with a first channel coding rate and a second priority is associated with a second channel coding rate.

69. The non-transitory computer-readable medium of any of clauses 66-68, wherein the code to determine the set of selectable redundancy versions for the transmission based on the single bit and whether the transmission is to be transmitted with repetitions comprises code to:
   determine a first set of selectable redundancy versions if the transmission is to be transmitted with repetitions;
   determine a second set of selectable redundancy versions if the transmission is not to be transmitted with repetitions; and
   determine a start position within the determined set of selectable redundancy versions based on the single bit.

70. The non-transitory computer-readable medium of any of clauses 66-69, wherein the set of selectable redundancy versions includes redundancy version 0 and one of redundancy version 2 or redundancy version 3.

71. A non-transitory computer-readable medium storing computer executable code, the code when executed by a processor causes the processor to:
   transmit a configuration of one or more downlink control information (DCI) formats to include a single bit for a redundancy version field;
   transmit a radio resource control (RRC) message indicating selectable redundancy versions;
   transmit a DCI based on the one or more DCI formats including the single bit for the redundancy version field, the DCI scheduling a transmission with a redundancy version selected from the selectable redundancy versions; and
   transmit or receive the transmission based on the redundancy version.

72. The non-transitory computer-readable medium of clause 71, wherein the RRC message indicates different selectable redundancy versions for an uplink DCI format and for a downlink DCI format.

73. The non-transitory computer-readable medium of clause 71 or 72, wherein the selectable redundancy versions include redundancy version 0 and one of redundancy version 2 or redundancy version 3.

74. The non-transitory computer-readable medium of any of clauses 71-73, wherein the RRC message indicates different selectable redundancy versions based on a priority of scheduled data for the transmission scheduled by the DCI.

75. The non-transitory computer-readable medium of clause 74, wherein a first priority is associated with a first channel coding rate and a second priority is associated with a second channel coding rate.

76. A non-transitory computer-readable medium storing computer executable code, the code when executed by a processor causes the processor to:
- transmit a configuration of one or more downlink control information (DCI) formats to include a single bit for a redundancy version field;
- determine a single bit that indicates a set of selectable redundancy versions for a transmission based on whether the transmission is to be transmitted with repetitions;
- transmit a DCI based on the one or more DCI formats including the single bit for the redundancy version field, the DCI scheduling a transmission with a redundancy version for each repetition selected according to the set of selectable redundancy versions;
- indicate whether the transmission scheduled by the DCI is to be transmitted with repetitions; and
- transmit or receive the transmission based on the set of selectable redundancy versions.

77. The non-transitory computer-readable medium of clause 76, wherein the code to determine the single bit that indicates the set of selectable redundancy versions is based on a priority of scheduled data for the transmission.

78. The non-transitory computer-readable medium of clause 77, wherein a first priority is associated with a first channel coding rate and a second priority is associated with a second channel coding rate.

79. The non-transitory computer-readable medium of any of clauses 76-78, wherein the code to determine the single bit that indicates the set of selectable redundancy versions for the transmission based on whether the transmission is to be transmitted with repetitions comprises code to:
- determine a first set of selectable redundancy versions if the transmission is to be transmitted with repetitions;
- determine a second set of selectable redundancy versions if the transmission is not to be transmitted with repetitions; and
- determine a starting redundancy version from the determined set of selectable redundancy versions based on the single bit.

80. The non-transitory computer-readable medium of any of clauses 76-79, wherein the set of selectable redundancy versions includes redundancy version 0 and one of redundancy version 2 or redundancy version 3. The previous description is provided to enable any person skilled in the art to practice the various aspects described herein.

Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The invention claimed is:

1. A method of wireless communication, comprising:
- receiving a configuration of one or more downlink control information (DCI) formats to include a single bit for a redundancy version in each of the one or more DCI formats;
- receiving a radio resource control (RRC) message indicating selectable redundancy versions, wherein the RRC message indicates different selectable redundancy versions for an uplink DCI format and for a downlink DCI format, wherein the RRC message indicates different selectable redundancy versions based on a priority of scheduled data for a transmission to be scheduled by a DCI;
- detecting the DCI based on the one or more DCI formats including the single bit for the redundancy version, the DCI scheduling the transmission;
- selecting a redundancy version from the selectable redundancy versions based on the single bit; and
- transmitting or receiving the transmission based on the redundancy version.

2. The method of claim 1, wherein a first priority is associated with a first channel coding rate and a second priority is associated with a second channel coding rate.

3. A method of wireless communication, comprising:
- receiving a configuration of one or more downlink control information (DCI) formats to include a single bit for a redundancy version in each of the one or more DCI formats;
- detecting a DCI based on the one or more DCI formats including the single hit for the redundancy version, the DCI scheduling a transmission;
- determining whether the transmission scheduled by the DCI is to be transmitted with repetitions;
- determining a set of selectable redundancy versions for the transmission based on the single bit and whether the transmission is to be transmitted with repetitions, wherein determining the set of selectable redundancy versions is further based on a priority of scheduled data for the transmission; and transmitting or receiving the transmission based on the set of selectable redundancy versions.

4. The method of claim 3, wherein a first priority is associated with a first channel coding rate and a second priority is associated with a second channel coding rate.

5. The method of claim 3, wherein determining the set of selectable redundancy versions for the transmission based on the single bit and whether the transmission is to be transmitted with repetitions comprises:

determining a first set of selectable redundancy versions if the transmission is to be transmitted with repetitions;

determining a second set of selectable redundancy versions if the transmission is not to be transmitted with repetitions; and determining a start position within the determined set of selectable redundancy versions based on the single bit.

6. The method of claim 3, wherein the set of selectable redundancy versions includes redundancy version 0 and one of redundancy version 2 or redundancy version 3.

7. An apparatus for wireless communication at a user equipment (UE), comprising:

one or more memories, individually or in combination, storing computer-executable instructions;

a transceiver; and one or more processors coupled to at least one of the one or more memories, individually or in combination, configured to execute the instructions to:

receive, via the transceiver, a configuration of one or more downlink control information (DCI) formats to include a single bit for a redundancy version in each of the one or more DCI formats;

receive a radio resource control (RRC) message indicating selectable redundancy versions, wherein the RRC message indicates different selectable redundancy versions for an uplink DCI format and for a downlink DCI format;

detect a DCI based on the one or more DCI formats including the single bit for the redundancy version, the DCI scheduling a transmission, wherein the RRC message indicates different selectable redundancy versions based on a priority of scheduled data for the transmission scheduled by the DCI;

select a redundancy version from the selectable redundancy versions based on the single bit; and transmit or receive, via the transceiver, the transmission based on the redundancy version.

8. The apparatus of claim 7, wherein a first priority is associated with a first channel coding rate and a second priority is associated with a second channel coding rate.

9. An apparatus for wireless communication at a user equipment (UE), comprising:

one or more memories, individually or in combination, storing computer-executable instructions;

a transceiver; and one or more processors coupled to at least one of the one or more memories and the transceiver and, individually or in combination, configured to execute the instructions to:

receive, via the transceiver, a configuration of one or more downlink control information (DCI) formats to include a single bit for a redundancy version in each of the, one or more DCI formats;

detect a DCI based on the one or more DCI formats including the single bit for the redundancy version, the DCI scheduling a transmission;

determine whether the transmission scheduled by the DCI is to be transmitted with repetitions;

determine a set of selectable redundancy versions for the transmission based on the single bit and whether the transmission is to be transmitted with repetitions, and further based on a priority of scheduled data for the transmission; and transmit or receive, via the transceiver, the transmission based on the set of selectable redundancy versions.

10. The apparatus of claim 9, wherein a first priority is associated with a first channel coding rate and a second priority is associated with a second channel coding rate.

11. The apparatus of claim 9, wherein the one or more processors, alone or in combination, are configured to:

determine a first set of selectable redundancy versions if the transmission is to be transmitted with repetitions;

determine a second set of selectable redundancy versions if the transmission is not to be transmitted with repetitions; and determine a start position within the determined set of selectable redundancy versions based on the single bit.

12. The apparatus of claim 9, wherein the set of selectable redundancy versions includes redundancy version 0 and one of redundancy version 2 or redundancy version 3.

* * * * *